US007902388B2

(12) United States Patent
Heise et al.

(10) Patent No.: US 7,902,388 B2
(45) Date of Patent: Mar. 8, 2011

(54) HIGH PUFA OIL COMPOSITIONS

(76) Inventors: Jerald D. Heise, St. Louis, MO (US);
Vallabh Makadia, St Louis, MO (US);
Juan P. Arhancet, Creve Coeur, MO
(US); David A. Morgenstern, Creve
Coeur, MO (US)

( * ) Notice: Subject to any disclaimer, the term of this patent is extended or adjusted under 35 U.S.C. 154(b) by 1035 days.

(21) Appl. No.: 11/266,983

(22) Filed: Nov. 4, 2005

(65) Prior Publication Data
US 2006/0110521 A1    May 25, 2006

Related U.S. Application Data

(60) Provisional application No. 60/633,914, filed on Dec. 6, 2004, provisional application No. 60/625,506, filed on Nov. 4, 2004.

(51) Int. Cl.
*C07C 57/00* (2006.01)
(52) U.S. Cl. .......................... 554/224; 426/601
(58) Field of Classification Search .................... 554/224
See application file for complete search history.

(56) References Cited

U.S. PATENT DOCUMENTS

| | | | |
|---|---|---|---|
| 4,089,880 A | 5/1978 | Sullivan |
| 4,915,972 A | 4/1990 | Gupta et al. |
| 4,948,811 A | 8/1990 | Spinner et al. |
| 5,130,449 A | 7/1992 | Lagarde et al. |
| 5,208,058 A | 5/1993 | Kotani et al. |
| 5,260,077 A | 11/1993 | Carrick et al. |
| 5,278,325 A | 1/1994 | Strop et al. |
| 5,286,886 A | 2/1994 | Van de Sande et al. |
| 5,315,020 A | 5/1994 | Cheng et al. |
| 5,387,758 A | 2/1995 | Wong et al. |
| 5,401,866 A | 3/1995 | Cheng et al. |
| 5,434,283 A | 7/1995 | Wong et al. |
| 5,516,924 A | 5/1996 | van de Sande et al. |
| 5,534,425 A | 7/1996 | Fehr et al. |
| 5,545,821 A | 8/1996 | Wong et al. |
| 5,625,130 A | 4/1997 | Grant et al. |
| 5,658,767 A | 8/1997 | Kyle et al. |
| 5,696,278 A | 12/1997 | Segers |
| 5,710,369 A | 1/1998 | Fehr et al. |
| 5,714,668 A | 2/1998 | Fehr et al. |
| 5,714,670 A | 2/1998 | Fehr et al. |
| 5,750,844 A | 5/1998 | Fehr et al. |
| 5,763,745 A | 6/1998 | Fehr et al. |
| 5,767,338 A | 6/1998 | Fan |
| 5,795,969 A | 8/1998 | Fehr et al. |
| 5,840,946 A | 11/1998 | Wong et al. |

(Continued)

FOREIGN PATENT DOCUMENTS

DE    2922146 A1    7/1980

(Continued)

OTHER PUBLICATIONS

JAPIO abstract of JP-63/044843.* Mickel et al., Effect of inert gases on the autoxidation of cis and trans polyunsaturated fatty acid methyl esters Rivista Italiana Delle Sostanze Grasse, 53:312-314 (1976).
Sayanova et al., Identification of primula fatty acid desaturases with n-3 FEBS Letters, 542:100-104 (2003).
Invitation/Partial Search Report issued in analogous application No. PCT/US2005/039809 dated Apr. 7, 2006.
Invitation/Partial Search Report issued in analogous application No. PCT/US2005/039807 dated Apr. 7, 2006.
Wilson et al., "Effect of Controlled Atmosphere Storage on Aflatoxin Production in High Moisture Peanuts (Groundnuts)" J. Stored Prod. Res., 12: 97-100 (1976).

(Continued)

*Primary Examiner* — Deborah D Carr
(74) *Attorney, Agent, or Firm* — Senniger Powers LLP; Chunping Li

(57) ABSTRACT

The present invention is directed to oil compositions having a high concentration of poly-unsaturated fatty acids. In addition, the oils of the present invention have advantageous stability characteristics and minimal trans-fatty acids.

17 Claims, 10 Drawing Sheets

U.S. PATENT DOCUMENTS

| | | | |
|---|---|---|---|
| 5,859,350 | A | 1/1999 | DeBonte et al. |
| 5,863,589 | A | 1/1999 | Covington, Jr. et al. |
| 5,866,762 | A | 2/1999 | DeBonte et al. |
| 5,965,755 | A | 10/1999 | Sernyk et al. |
| 5,969,169 | A | 10/1999 | Fan |
| 5,981,781 | A | 11/1999 | Knowlton |
| 6,022,577 | A | 2/2000 | Chrysam et al. |
| 6,063,424 | A | 5/2000 | Wells et al. |
| 6,133,509 | A | 10/2000 | Fehr et al. |
| 6,147,237 | A | 11/2000 | Zwanenburg et al. |
| 6,169,190 | B1 | 1/2001 | Lanuza et al. |
| 6,172,248 | B1 | 1/2001 | Copeland et al. |
| 6,201,145 | B1 | 3/2001 | Fan |
| 6,229,033 | B1 | 5/2001 | Knowlton |
| 6,303,849 | B1 | 10/2001 | Potts et al. |
| 6,313,328 | B1 | 11/2001 | Ulrich et al. |
| 6,340,485 | B1 | 1/2002 | Coupland et al. |
| 6,388,110 | B1 | 5/2002 | Ulrich et al. |
| 6,388,113 | B1 | 5/2002 | Martinez Force et al. |
| 6,459,018 | B1 | 10/2002 | Knutzon |
| 6,559,325 | B2 | 5/2003 | Fan |
| 6,562,397 | B2 | 5/2003 | DeBonte et al. |
| 6,583,303 | B1 | 6/2003 | DeBonte et al. |
| 6,610,867 | B2 | 8/2003 | Jakel et al. |
| 6,667,064 | B2 | 12/2003 | Surette |
| 6,797,172 | B2 | 9/2004 | Koseoglu et al. |
| 6,844,021 | B2 | 1/2005 | Koike et al. |
| 6,906,211 | B2 | 6/2005 | Tysinger et al. |
| 6,924,381 | B2 | 8/2005 | Dawson |
| 2003/0180434 | A1 | 9/2003 | Fan |
| 2003/0198728 | A1 | 10/2003 | Sundram et al. |
| 2004/0047971 | A1 | 3/2004 | Alander |
| 2004/0049813 | A1 | 3/2004 | Russell, Jr. et al. |
| 2008/0063691 | A1 | 3/2008 | Ursin et al. |
| 2008/0260929 | A1 | 10/2008 | Ursin et al. |

FOREIGN PATENT DOCUMENTS

| | | |
|---|---|---|
| EP | 0 077 528 A | 4/1983 |
| EP | 0 226 245 B1 | 6/1987 |
| EP | 0 323 753 B1 | 7/1989 |
| EP | 0 326 198 A2 | 8/1989 |
| EP | 0 347 056 A | 12/1989 |
| EP | 0 348 004 A2 | 12/1989 |
| EP | 2241503 A | 9/1991 |
| EP | 0 476 093 B1 | 3/1992 |
| EP | 0 526 954 B1 | 2/1993 |
| EP | 0 606 359 B1 | 7/1994 |
| EP | 0 639 333 A1 | 2/1995 |
| EP | 0 813 357 B1 | 3/1995 |
| EP | 0 672 096 B1 | 9/1995 |
| EP | 0 833 882 B1 | 4/1998 |
| EP | 0 936 266 A | 8/1999 |
| GB | 715352 | 9/1954 |
| GB | 2 241 503 A | 9/1991 |
| JP | 63044843 * | 2/1988 |
| WO | WO 93/19626 A | 10/1993 |
| WO | WO 96/36684 A1 | 11/1996 |
| WO | WO 99/64614 A | 12/1999 |
| WO | WO 00/44862 A | 8/2000 |
| WO | 02/092779 A2 | 11/2002 |
| WO | WO 02/092073 A1 | 11/2002 |
| WO | WO 03/049832 A1 | 6/2003 |
| WO | WO 2004/009827 A | 1/2004 |
| WO | WO 2004/071467 A2 | 8/2004 |
| WO | 2005/021761 A1 | 3/2005 |
| WO | 2005/102310 A1 | 11/2005 |

OTHER PUBLICATIONS

PCT International Search Report for analogous application No. PCT/US2005/039809 mailed Jun. 3, 2006.

Chu, Y.-H., et al., "Factors Affecting the Content of Tocopherol in Soybean Oil," Journal of the American Oil Chemists' Society, Dec. 1993, pp. 1263-1268, vol. 70, No. 12.

List, G. R., et al., "Oxidation and Quality of Soybean Oil: A Preliminary Study of the Anisidine Test," Journal of the American Oil Chemists' Society, Feb. 1974, pp. 17-21, vol. 51.

List, G. R., et al., "Potential Margarine Oils from Genetically Modified Soybeans," Journal of the American Oil Chemists' Society, 1996, pp. 729-732, vol. 73, No. 6.

Mounts, T. L., et al., "Performance Evaluation of Hexane-Extracted Oils from Genetically Modified Soybeans," Journal of the American Oil Chemists' Society, Feb. 1994, pp. 157-161, vol. 71, No. 2.

Neff, W. E., et al., "Oxidative Stability of Natural and Randomized High-Palmitic- and High-Stearic-Acid Oils from Genetically Modified Soybean Varieties," Journal of the American Oil Chemists' Society, 1999, pp. 825-831, vol. 76, No. 7.

Yan, K.-M., et al., "Extraction and Refining of Black Currant Seed Oil," China Oils and Fats, Feb. 2004, pp. 32-33, vol. 29, No. 2.

Cargill, ClearValley 85, High Oleic Canola Oil, Oil Stability, product brochure, www.clearvalleyoils.com, 2003.

Cargill, Clear Valley 85, High Oleic Canola Oil, Zero Trans Fat Oil with Exceptional Ability to Resist Heat and Oxidation, product brochure, www.clearvalleyoils.com, 2003.

Dow Agrosciences, Natreon Canola Oil, product brochure, www.dowagro.com/natreon/canola/index.htm, 2003.

Dow Agrosciences, Natreon Canola Oil, Natreon History, product brochure, www.dowagro.com/natreon/canola/history.htm, 2003.

Dow Agrosciences, Natreon Canola Oil, Natreon vs. Other Oils, product brochure, www.dowagro.com/natreon/canola/oils.htm, 2003.

Russin et al., Novel Method for Rapid Monitoring of Lipid Oxidation by FTIR Spectroscopy Using Disposable IR Cards, JAOCS, 80(7):635-641 (2003).

Cargill, Odyssey, 95 High Stability Canola Oil, Zero Trans Fat High Stability Oil., product brochure, www.clearvalleyoils.com, 2003.

Maritex, Product List for Omega-3 Oils, www.maritex.com (4pages), 2003.

Russin et al., "Rapid Determination of Oxidative Stability of Edible Oils by FTIR Spectroscopy Using Disposable IR Cards," JAOCS, 81(2):111-116 (2004).

Cargill, Clear Valley, High Oleic Sunflower Oil, Zero Trans Fat Oil. High Oxidative Stability. All Natural, product brochure, www.cidarvalleyoils.com, 2003.

Cargill, Clear Valley 75, High Oleic Canola Oil, Zero Trans Fat Oil. High Stability. Fresh Flavor. Long Product Shelf Life. Product brochure, www.clearvalleyoils.com, 2003.

Cargill, Clear Valley 65, High Oleic Canola Oil, Zero Trans Fat Oil with Exceptional Stability in High Heat Applications. Product brochure, www.clearvalleyoils.com, 2003.

* cited by examiner

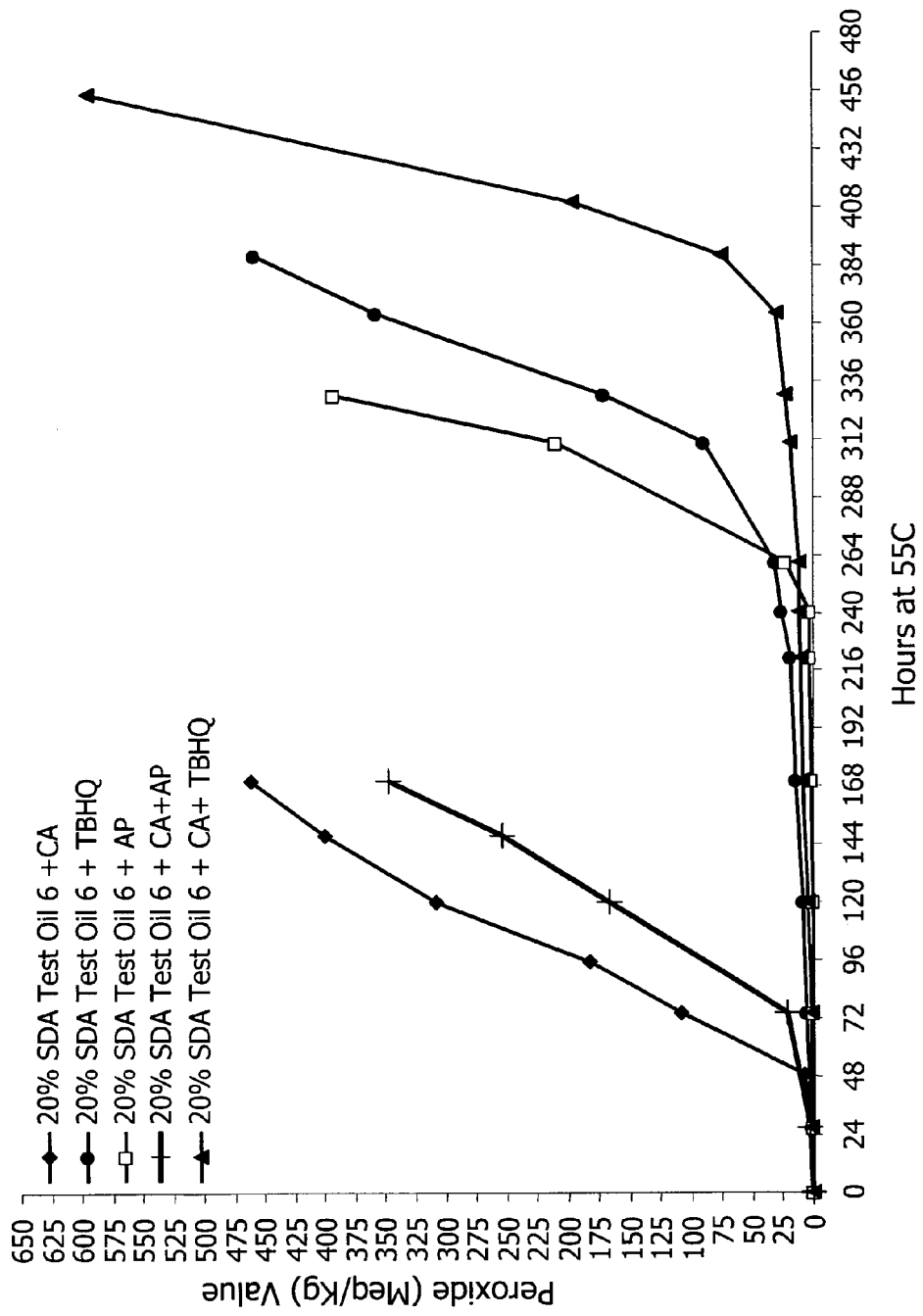

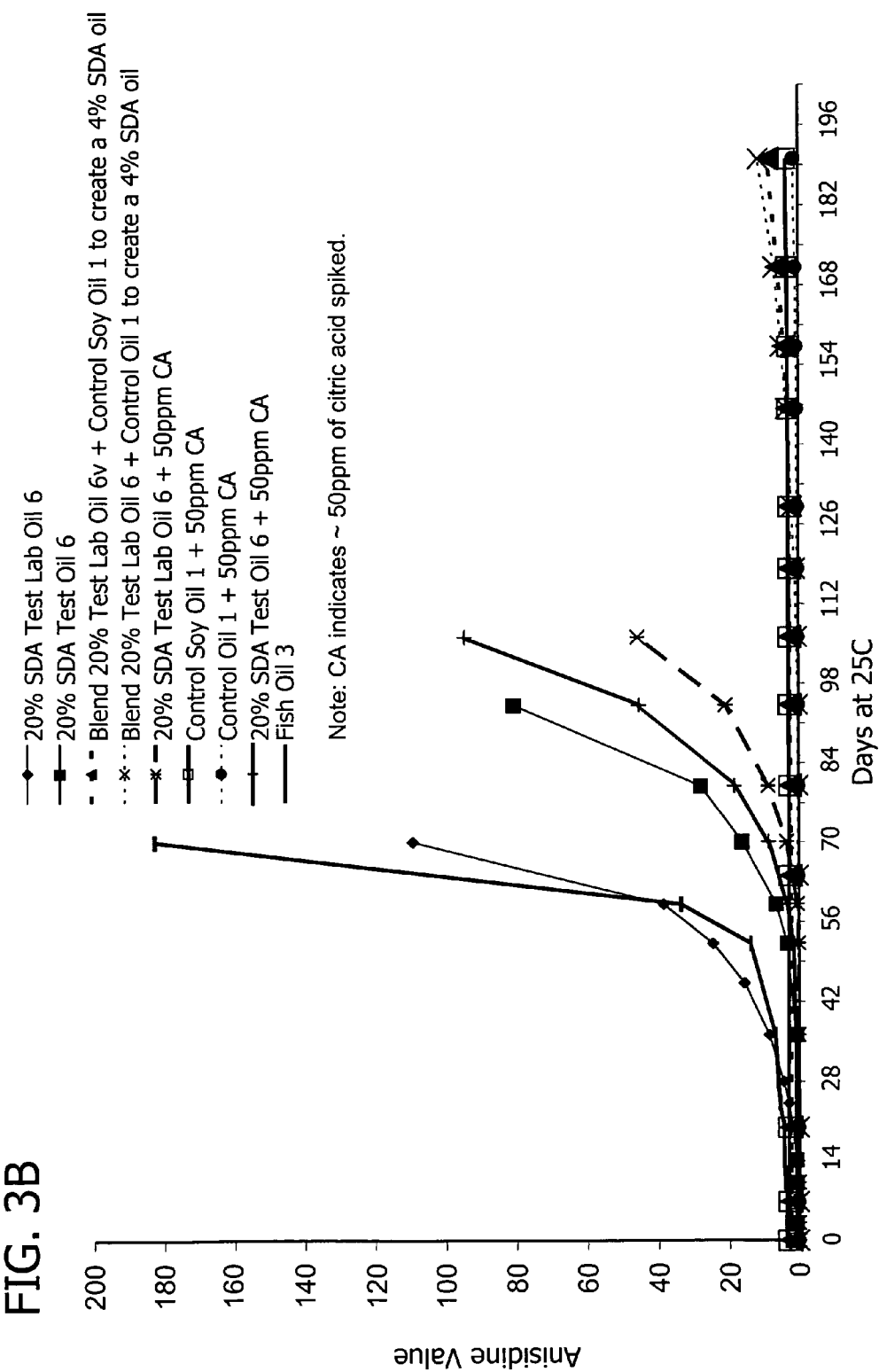

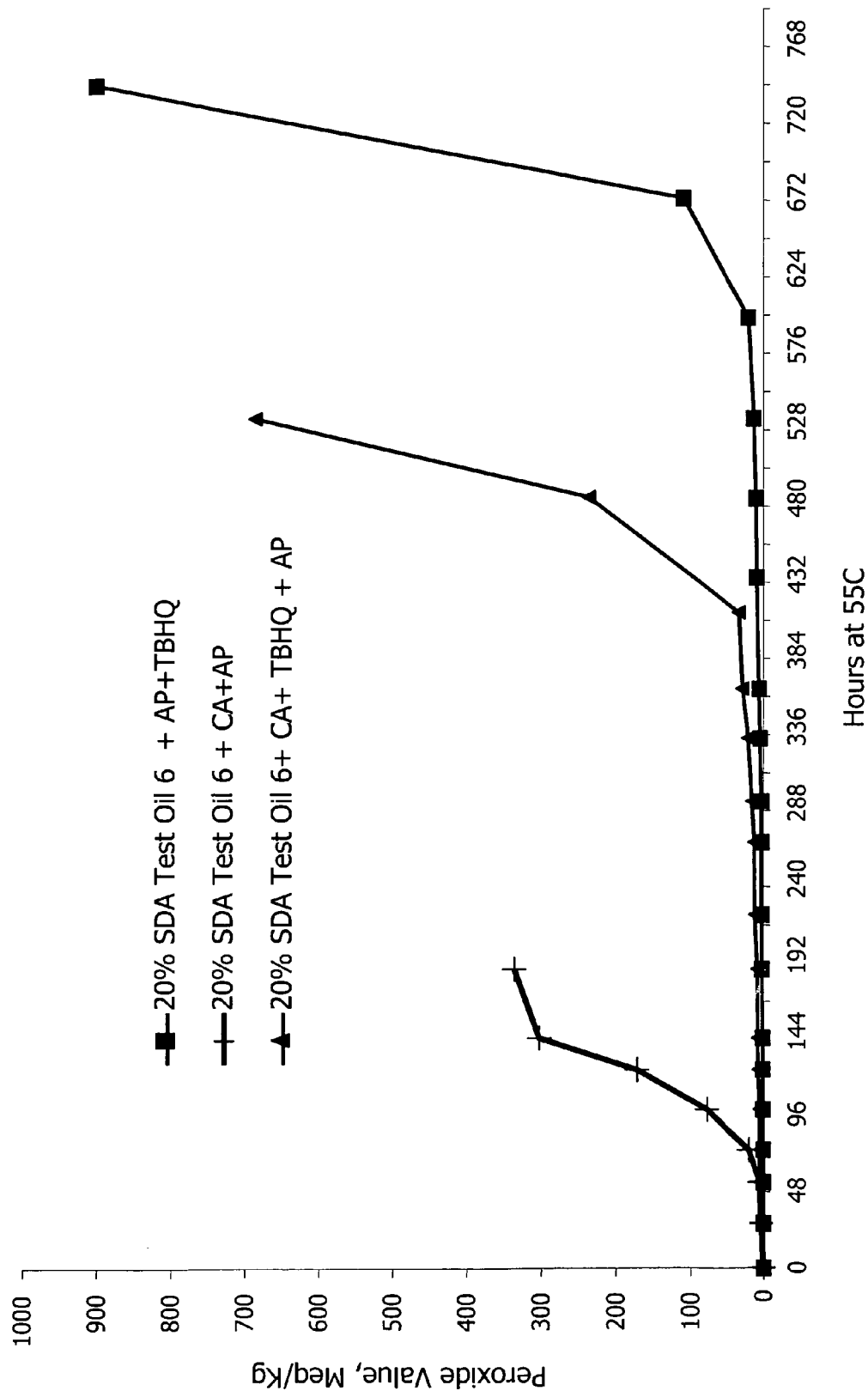

HIGH PUFA OIL COMPOSITIONS

REFERENCE TO RELATED APPLICATIONS

This application claims the benefit under 35 USC 119(e) from U.S. provisional application Ser. No. 60/633,914 filed Dec. 6, 2004, and Ser. No. 60/625,506 filed Nov. 4, 2004.

FIELD OF THE INVENTION

The present invention relates to non-hydrogenated or partially hydrogenated non-animal oils having a low level of trans-fatty acids and improved flavor and performance attributes especially suitable for food applications and processes for the preparation thereof.

As consumers have become more aware of the health impact of lipid nutrition, consumption of oils with high levels of unsaturated and polyunsaturated fats and low levels of trans-fats is desirable.

Oils containing long chain polyunsaturated fatty acids (PUFAs) can be used as food ingredients. PUFAs of importance include docosahexaenoic acid (DHA), eicosapentaenoic acid (EPA), alpha-linolenic acid (ALA), gamma-linolenic acid (GLA), docosapentaenoic acid (DPA), arachidonic acid (all-cis-5,8,11,14-eicosatetraenoic acid; AA) and stearidonic acid (cis-6,9,12,15-octadecatetraenoic acid; SDA). Many of these PUFAs are found in marine oils and plant seeds. PUFAS are important components of phospholipids found in the plasma membrane of the cell, and are precursors to other molecules of importance in human beings and animals, including the prostacyclins, leukotrienes and prostaglandins. Moreover, PUFAs are necessary for proper development, particularly in the developing infant brain, and for tissue formation and repair.

PUFAs may be extracted from natural sources or synthesized by various organisms. However, there are several disadvantages associated with commercial production of PUFAs from natural sources. Natural sources of PUFAs, such as animals and plants, tend to have highly heterogeneous oil compositions. The oils obtained from these sources can require extensive purification to separate out one or more desired PUFAs or to produce an oil which is enriched in one or more PUFA. Fish oils containing significant quantities of EPA and DHA can have unpleasant tastes and odors, which would make them undesirable food ingredients or supplements. Furthermore, in some cases, fish oil capsules can contain low levels of the desired component and retain undesirable levels of other components, including contaminants.

PUFAs are considered to be useful for nutritional, pharmaceutical, industrial, and other purposes. Therefore, it is of interest to extract oils having high levels of PUFAs from genetically-modified seeds; these seeds have been modified to contain higher concentrations of SDA as compared to the corresponding naturally-occurring seed.

SUMMARY OF THE INVENTION

One embodiment of the invention is directed to an oil composition comprising at least 0.4 wt. % of at least one polyunsaturated fatty acid having four or more carbon-carbon double bonds or a derivative thereof based upon the total weight of fatty acids or derivatives thereof in the composition, the composition having either: a peroxide value of less than about 1 meq/kg and being derived from a source other than a marine oil; an anisidine value of less than about 3 and being derived from a source other than a marine oil; at least one additional polyunsaturated fatty acid having four or more carbon-carbon double bonds or a derivative thereof, and an anisidine value of less than about 3; at least about 400 ppm tocopherols; or less than 1 wt. % trans-fatty acid.

Another embodiment of the invention is directed to an oil composition comprising at least 0.4 wt. % of at least one polyunsaturated fatty acid having four or more carbon-carbon double bonds or a derivative thereof based upon the total weight of fatty acids or derivatives thereof in the composition, the composition being derived from a genetically-modified seed selected from the group consisting of *Arabidopsis*, canola, carrot, coconut, corn, cotton, flax, linseed, maize, palm kernel, peanut, potato, rapeseed, safflower, soybean, sunflower, tobacco, and mixtures thereof.

Yet another aspect of the invention is directed to a process for maintaining the storage stability of an oil during shipment or storage, the process comprising storing an oil of the invention in a container at a temperature ranging from about 4 to about 45° C. for at least one month, wherein the oil has an anisidine value of less than 3 after storage.

Yet another aspect of the invention is directed to a process for maintaining the storage stability of an oil during shipment or storage, the process comprising storing an oil of the invention in a container at a temperature ranging from about 4 to about 45° C. for at least one month, wherein the absolute change in the anisidine value of the oil during storage is no more than about 20.

Yet another aspect of the invention is directed to a process for maintaining the storage stability of an oil during shipment or storage, the process comprising storing an oil of the invention in a container; and freezing the container.

Yet another aspect of the invention is directed to a process for maintaining the storage stability of an oil during shipment or storage, the process comprising encapsulating the oil of the invention in an encapsulation material.

Yet another aspect of the invention is directed to a food composition, beverage, nutritional supplement, or cooking oil comprising an oil of the invention.

BRIEF DESCRIPTION OF THE DRAWINGS

FIG. 1A is a graph of peroxide value (PV) vs. time for an oil composition comprising 20 wt. % stearidonic acid (SDA) and various added stabilizers. The graph of FIG. 1 shows the results of an accelerated aging test carried out at 55° C.

FIG. 3B is a graph of AV vs. time for 20% SDA, 4% SDA blend, 20% SDA with citric acid, and control soy oil compositions. The graph of FIG. 3 shows the results of a room temperature aging test carried out at 25° C.

FIG. 6A is a graph of peroxide value (PV) vs. time for a 20% SDA oil composition containing (i) ascorbyl palmitate (AP) and TBHQ, (ii) citric acid (CA) and ascorbyl palmitate (AP), and (iii) citric acid (CA), TBHQ, and ascorbyl palmitate (AP).

DETAILED DESCRIPTION

Figure 1B:
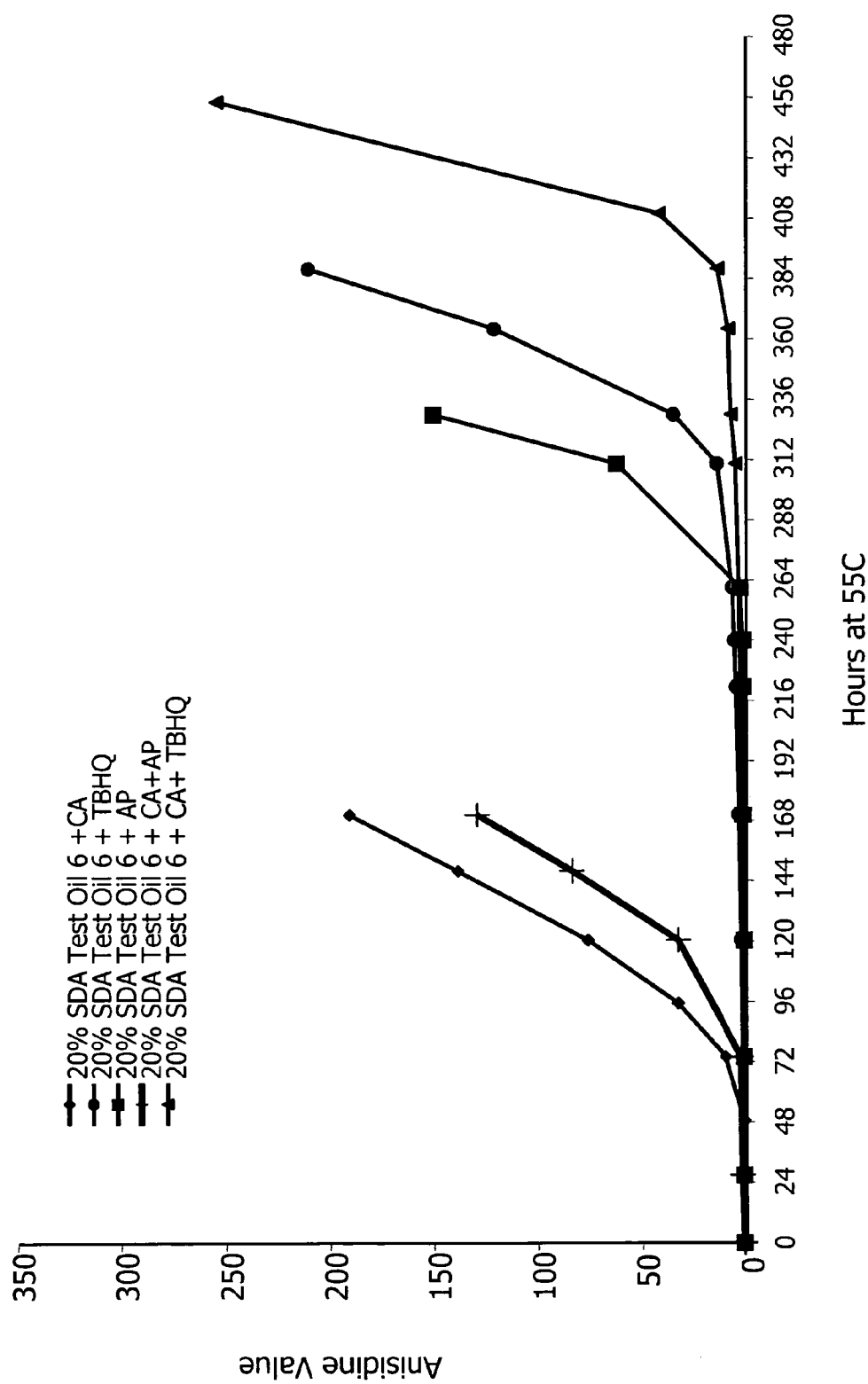
FIG. 1B is a graph of anisidine value (AV) vs. time for an oil composition comprising 20 wt. % stearidonic acid (SDA) and various added stabilizers. The graph of FIG. 1 shows the results of an accelerated aging test carried out at 55° C.

The oils of the present invention have improved stability in terms of taste and smell and low levels of trans-fatty acids. In one embodiment, certain oils of the invention can be used as food ingredients, due to the health benefits of the consumption of highly unsaturated fats. It is known that consumption of saturated fats has a negative impact on cardiovascular health. However, consumption of fatty acids having four or more double bonds is desirable. Due to the high level of unsaturation (four or more double bonds), certain oils of the present invention are less stable than oils with a lower level of unsaturation (less than four double bonds). Lower stability of certain oils of the invention leads to decomposition reactions of fatty acids that form undesirable peroxides and hydroperoxides. The subsequent decomposition of these oxidation products can form volatile and non-volatile aldehydes and/or ketones. The non-volatile components can catalyze further oxidation of the oils and the volatile components give rise to undesirable taste and smell.

An aspect of the present invention is an oil composition having a content of at least about 0.4 wt. % polyunsaturated fatty acid having four or more carbon-carbon double bonds or a derivative thereof (e.g., SDA) based on the total weight of fatty acids in the composition, the composition having an anisidine value of less than about 3 and being derived from a source other than a marine oil.

The process for preparing the oils of the present invention has been developed by optimizing the many factors that affect the rate of the oxidation processes including seed storage and treatment, the concentrations of pro-oxidants (e.g., oxygen, chlorophyll and metals), the temperature of the system, the exposure of the seed meats or oil to light and the concentration of stabilizers or antioxidants present naturally (e.g., tocopherols) or otherwise. The relationships between these factors are complex. The process provides oil compositions with improved seed oil stability as characterized by sensory and flavor data when compared to seed oils prepared by conventional methods.

I. Oil Compositions
A. Oxidative Stability

The various oil compositions of the invention are oils extracted from various non-animal sources. Advantageously, the compositions of the invention possess greater stability than known oil compositions.

Generally, the stability of oils is important for determining their use. For example, oils having a high concentration of omega-3 fatty acids are known to provide positive health benefits and could advantageously be used as food ingredients. In particular, omega-3 fatty acids are known to benefit cardiovascular health, cognitive development, infant nutrition and aid in the prevention of cancer, rheumatoid and osteoarthritis, and mental illness. Currently, a main source of omega-3 fatty acids is fish oils. The omega-3 fatty acids are more reactive due to the larger number (3 or more) of double bonds in the fatty acids. Thus, finding a good source of omega-3 oils for use as a food ingredient (e.g., to add to bread, crackers, salad dressings, mayonnaise, margarines and spreads, pet foods, beverages, etc.) has been a challenge due to the taste and smell of omega-3 oils processed from fish oils. Accordingly, an aspect of the present invention is to provide a source of omega-3 fatty acids that has the taste and smell characteristics advantageous for use as a food ingredient and/or a product with potential health benefits.

Generally, oils having a greater number of olefinic functionalities have higher oxidation rates than oils having a lower number of olefinic functionalities. The reaction schemes describing the oxidation of unsaturated fatty acids (UFAs) include radical chain reactions characterized as initiation, propagation and termination reactions. An example of an initiation reaction involves abstracting a hydrogen atom from a fatty acid to produce a fatty acid with a free radical. UFAs having more than one double bond and having an allylic carbon are more reactive than polyunsaturated fatty acids having other configurations because the allylic hydrogen is more easily abstracted and the allylic radical is more stable than other radicals. During propagation, the UFA with an allylic radical can react with molecular oxygen to produce a peroxide compound. The peroxide compound can react with another UFA to abstract a hydrogen atom and produce another fatty acid radical in a propagation step. Alternately, an allylic radical can react with another radical to produce an inactive product in a termination step.

Factors affecting the oxidation of oils with one or more unsaturated fatty acids are a function of the concentration of agents which initiate the abstraction of a hydrogen atom from a UFA, the concentration of molecular oxygen, the concentration of compounds which react with the radicals to form stable products (e.g., stabilizers or other radicals that result in termination) and various other reaction conditions that increase or decrease the reaction rates of the oxidation reactions. Molecular oxygen is one of the most important species needed to sustain the production of peroxide compounds from UFAs and the factors discussed herein above have complex relationships.

Generally, the relationship of the concentration of prooxidants, which initiate the formation of radical species, to the stability of the highly unsaturated oils depends on the specific pro-oxidant and the initiation reaction that occurs. When molecular oxygen is taken up in a propagation step of the overall oxidation reaction scheme, the relationship between molecular oxygen concentration and the rate of UFA oxidation is approximately linear. However, molecular oxygen can participate in other types of reactions in the overall oxidation reaction scheme. For example, a proposed initiation mechanism is the abstraction of hydrogen from an UFA by trace metal ions. Furthermore, it has been found that UV light and temperature increase the rates of direct attack by oxygen on UFAs. It is also believed that UFAs are oxidized by hydrogen peroxide produced from metal-catalyzed water decomposition or by reaction with trace amounts of singlet oxygen. All of these reactions are plausible and lead to complex relationships between the processing factors, stability, and oil quality discussed herein below.

While the relationship of the concentration of stabilizers to the rate of UFA oxidation depends on the specific stabilizer, this relationship can be complicated by the presence of more than one stabilizer. The addition of multiple stabilizers can act to stabilize each other and when this occurs, a combination of two or more stabilizers can be more effective at terminating free radicals than a single stabilizer. For example, this combination of stabilizers can have an additive effect or work together to produce an effect which is greater than that achieved using the same amount of either stabilizer.

Despite the complexity of UFA oxidation, the stability of compositions containing UFAs can be determined by measuring certain types of compounds produced by the various oxidation reactions. For example, the peroxide value (PV) is the concentration of peroxide compounds in the oil measured in meq/kg. Peroxide compounds are produced during UFA oxidation, thus, the higher the value of PV, the more UFA oxidation that has occurred. Furthermore, the PV of the oil can be minimized by reducing the formation of peroxides or by removing/decomposing the peroxides or hydroperoxides present in the oil. The PV can be minimized by a variety of techniques, including, but not limited to processing protocols.

Another type of measurement that is utilized to assess the post-oxidative stress that the oil has been exposed to is referred to as the anisidine value (AV) of the oil. The AV indicates the amount of oxidation that the oil has experienced prior to measurement and is a measure of the concentration of the secondary oxidation products. The AV of an oil is a measure of the amount of non-volatile aldehydes and/or ketones in the oil. As the AV of the oil measures the non-volatile aldehyde and/or ketone concentration in the oil (typically, unitless), it is a measure of its oxidative history. Aldehydes and ketones are produced from the decomposition of the peroxide or hydroperoxide species, which are primary oxidation products of the olefinic functionality on a fatty acid. Methods for measuring PV or AV of an oil are well known in the art and include AOCS Cd 8-53 and AOCS Cd 18-90, respectively.

Minimizing the amount of oxidation measured by PV and AV can have significant implications when assessing the oxidative stability of an oil. For example, peroxides and hydroperoxides can readily decompose to form off flavors and aldehydes and ketones, which can act as catalysts for the further oxidative decomposition of the oil.

Another measure of oxidation of fatty acids is a total oxidation or totox value. The totox value combines measures of the primary (PV) and secondary (AV) oxidation products and is calculated by the equation 2PV+AV.

A method for determining the oxidative stability is the oxidative stability index (OSI); one method for measuring OSI is AOCS Cd 12b-92. The value for the OSI is the time (usually in hours) before the maximum rate change of oxidation (generally referred to as the propagation phase of the oxidation reaction); this time is usually called the induction period. Although there are many factors that affect an oil's OSI value, the value is useful along with the other measures for making semi-quantitative predictions about oil stability.

Another method for determining the oxidative stability of an oil is to utilize a standardized sensory evaluation. Generally, the standardized sensory evaluation assesses the smell, taste, tactile attributes and flavor of the oil and also, the characteristics of a food product containing the oil by deep-frying the food in the oil or otherwise incorporating the oil in the food. For example, many characteristics of the oil and foods prepared using the oils or having the oil as an ingredient can be evaluated. In addition, the trained panelists can select from a variety of numeric scales to rate the acceptability of the oils tested in the sensory evaluation. A person skilled in the art would be able to design an appropriate sensory evaluation.

The sensory evaluation results determine the acceptability of the oil for the specific use and as such, are an important measure of oil stability.

Specific odor and taste indicators associated with oils include bacony, beany, bitter, bland, burnt, cardboardy, corny, deep fried, fishy, fruity, grassy, green, hay, heated oil, hully, hydrogenated oil, lard, light struck oil, melon, metallic, musty, nutty, overheated oil, oxidized, pointy, paraffin oil, peanut oil, pecan oil, petroleum, phenolic, pine oil, plastic, pondy, pumpkin, rancid, raw, reverted oil, rubbery, soapy, sour, sulfur, sunflower seed shell, watermelon, waxy, weedy and woody. Typically, oils containing more than four double bonds are characterized by a fishy or pondy odor. One embodiment of the present invention is to produce oils containing more than four double bonds, which are bland in taste and odor at the time of manufacture. Another embodiment of the invention is to have these oils retain their bland sensory properties when stored for several months.

B. Oil Compositions Having Fatty Acids with 4 or More Double Bonds

There are two main families of polyunsaturated fatty acids, specifically Omega-3 and Omega-6 fatty acids. Humans can synthesize omega-6 and omega-3 polyunsaturated fatty acids from the so-called essential fatty acids, linoleic acid (LA, C18:2 ω6) and α-linolenic acid (ALA, C18:3 ω3) by a $\Delta^6$-desaturation pathway. LA is produced from oleic acid (C18:1 ω9) by a $\Delta^{12}$-desaturase. LA is in turn converted to γ-linolenic acid (GLA, C18:3 ω6) or ω6-eicosadienoic acid (EDA) by a $\Delta^6$-desaturase or elongase, respectively. GLA and EDA are each then converted to dihomo-γ-linolenic acid (DGLA, C20:3) by an elongase or a $\Delta^8$ desaturase, respectively. DGLA forms arachidonic acid (M, C20:4 ω6), catalyzed by a $\Delta^5$ desaturase. AA, in turn, is converted to eicosapentaenoic acid (EPA, C20:5 ω3) by a $\Delta^{17}$ desaturase. Alternatively, LA can be converted to α-linolenic acid (ALA, C18:3 ω3). ALA is in turn converted to either stearidonic acid (SDA, C18:4 ω3) or eicosatrienoic acid (EtrA, C20:3 ω3). Both SDA and EtrA are then converted to eicosatetraenoic acid (ETA, C20:4), which is converted to EPA. EPA is then converted to docosapentaenoic acid (DPA, C22:5) by an elongase, which is then converted to docosahexaenoic acid (DHA, C22:6) by a $\Delta^4$-desaturase. However, these pathways are very inefficient, and to obtain these polyunsaturated fatty acids directly from the diet is considered necessary.

In one exemplary embodiment of the present invention, an oil composition comprises at least about 0.4, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44 or 45 wt. % or more of at least one polyunsaturated fatty acid having four or more carbon-carbon double bonds or a derivative thereof, based on the total weight of fatty acids or derivatives thereof in the composition. In one embodiment, the composition further comprises at least about 400, 450, 500, 600, 700, 800, 805, 810, 820, 830, 840, 850, 860, 870, 880, 890, 900, 1000, 1100, 1200, 1300, 1400, 1500, 1600, 1700, 1800, 1900, 2000 ppm tocopherols or more. In another embodiment, the composition has a peroxide value of less than about 0.1, 0.2, 0.3, 0.4, 0.5, 0.6, 0.7, 0.8, 0.9 or 1.0 meq/kg, and is derived from a source other than a marine oil (e.g., other than fish oil, algal oil, etc). In another embodiment, the composition has an anisidine value of less than about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or 3.0, and is derived from a source other than a marine oil. In yet another embodiment, the composition has an anisidine value of less than about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or 3.0, and comprises at least one additional polyunsaturated fatty acid having four or more carbon-carbon double bonds or a derivative thereof. In yet another embodiment, the composition further comprises less than 1 wt. % trans-fatty acid.

Further, the present invention is directed to an oil composition comprising at least about 0.4, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44 or 45 wt. % or more of at least one polyunsaturated fatty acid having four or more carbon-carbon double bonds or a derivative thereof, based on the total weight of fatty acids or derivatives thereof in the composition, the composition being derived from genetically-modified seed of $Arabidopsis$, canola, carrot, coconut, corn, cotton, flax, linseed, maize, palm kernel, peanut, potato, rapeseed, safflower, soybean, sunflower, and/or tobacco. In one embodiment, the composition has a peroxide value of 0, 0.1, 0.2, 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10.0 meq/kg. In another embodiment, the composition has an anisidine value of 0, 0.1, 0.2, 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19 or 20. In another embodiment, the composition has a totox value of 0, 0.1, 0.2, 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, 25 or 26. In yet another embodiment, the composition further comprises up to 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, or 5000 ppm tocopherols or more. Tocopherols are naturally-occurring stabilizers and include α-tocopherol, β-tocopherol, γ-tocopherol, and δ-tocopherol. In yet another embodiment, the composition further comprises not more than 0.1, 0.2, 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10.0 wt. % trans-fatty acid. In another embodiment, the composition further comprises at least about 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt. % γ-linolenic acid (GLA; C18:3) or a derivative thereof.

Exemplary polyunsaturated fatty acids, or derivatives thereof, having three or more double bonds are stearidonic acid (SDA, C18:4), eicosatetraenoic acid (ETA), eicosapentaenoic acid (EPA; C20:5), docosapentaenoic acid (DPA; C22:5), docosahexaenoic acid (DHA), and arachidonic acid (AA; C20:4). Preferably, the polyunsaturated fatty acid or derivative thereof of the above described oil compositions comprises at least one omega-3 or omega-6 fatty acid, and preferably comprises omega-3 stearidonic acid (SDA; C18: 4), omega-3 eicosatetraenoic acid (ETA), omega-3 eicosapentaenoic acid (EPA; C20:5), omega-3 docosapentaenoic acid (DPA; C22:5), omega-3 docosahexaenoic acid (DHA; C22:6), or omega-6 arachidonic acid (AA; C20:4).

This invention is also useful for genetically modified plant oils containing elevated levels of polyunsaturated fatty acids containing three carbon-carbon double bonds or more. Examples include seeds of plants derived from $Arabidopsis$, canola, carrot, coconut, corn, cotton, flax, linseed, maize, palm kernel, peanut, potato, rapeseed, safflower, soybean, sunflower, and/or tobacco. Exemplary polyunsaturated fatty acids, or derivatives thereof, having three or more double bonds are stearidonic acid (SDA, C18:4), eicosatrienoic acid (EtrA, C20:3), eicosatetraenoic acid (ETA, C20:4), eicosapentaenoic acid (EPA; C20:5), docosapentaenoic acid (DPA; C22:5), docosahexaenoic acid (DHA, C22:6), gamma linolenic acid (GLA, C18:3), dihomogammalinolenic acid (DGLA, C20:3) and arachidonic acid (AA; C20:4). Preferably, the polyunsaturated fatty acid or derivative thereof of the above described oil compositions comprises at least one omega-3 or omega-6 fatty acid, and preferably comprises omega-3 stearidonic acid (SDA, C18:4), omega-3 eicosatrienoic acid (EtrA, C20:3), omega-3 eicosatetraenoic acid (ETA, C20:4), omega-3 eicosapentaenoic acid (EPA; C20:5), omega-3 docosapentaenoic acid (DPA; C22:5), omega-3 docosahexaenoic acid (DHA, C22:6)), omega-6 gamma linolenic acid (GLA, C18:3), omega-6 dihomogammalinolenic acid (DGLA, C20:3) or omega-6 arachidonic acid (AA; C20: 4).

The compositions described above in this section can further comprise γ-linolenic acid or a derivative thereof (C-γ18: 3), or DH-γ-linolenic acid (C-DH-γ20:3) or a derivative thereof.

As discussed herein above, oils having relatively higher concentrations of omega-3 fatty acid units are advantageous food ingredients. The process of the present invention can be used to extract oils from oilseeds containing at least one polyunsaturated fatty acid having four or more carbon-carbon double bonds or a derivative thereof, such as stearidonic acid, in an amount greater than about 0.4, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44 or 45 wt. % or more based on the total weight of fatty acids in the composition, the composition having an anisidine value of less than about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or 3.0. Preferably, the oilseeds extracted are seeds containing a similar proportion of SDA to total fatty acid content as the oil composition. Therefore, the SDA content in the whole seed is at least about 0.4 wt. % of its total fatty acid concentration. Furthermore, the SDA content in the oil throughout the process is at least about 0.4, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 wt. % based on the total weight of fatty acids in the composition.

In another embodiment, the whole seed or oil composition during or after processing has a linoleic acid (LA, C18:2n6) content of up to about 18, 19, 20, 21, 22, 23, 24, 25, 30, 35 or 40 wt. % based on the total weight of fatty acids in the composition, and an SDA content of at least about 0.4, 5, 10, 15, 20, 25, 30, 35, 40 or 45 wt. % based on the total weight of fatty acids in the composition. Note that another polyunsaturated fatty acid having four or more carbon-carbon double bonds or a derivative thereof can be substituted for SDA in these compositions or any other SDA compositions described in this section.

Alternatively, an oil composition during or after processing has an SDA content of at least about 0.4 wt. % based on the total weight of fatty acids in the composition and an AV during or after processing of up to about 0.5, 0.6, 0.7, 0.8, 0.9, 1.0, 1.1, 1.2, 1.3, 1.4, 1.5, 1.6, 1.7, 1.8, 1.9 or 2. In a particular embodiment, the oil composition is a refined, bleached and deodorized (RBD) oil composition having an SDA content of at least about 0.4 wt. % based on the total weight of fatty acids in the composition and an AV of up to about 0.1, 0.2, 0.3, 0.4 or 0.5.

In yet a further embodiment, the RBD oil has an SDA content of at least about 0.4 wt. % based on the total weight of fatty acids in the composition and an OSI of at least about 0.5, 0.6, 0.7, 0.8, 0.9, 1, 1.1, 1.2, 1.3, 1.4 or 1.5 hours at 110° C.

Further, the oil compositions described in section 1.B. can be derived from a plant oil other than blackcurrant oil, borage oil, *Echium* oil, evening primrose oil, gooseberry oil, hemp oil, or redcurrant oil. Moreover, the composition of the oils can be derived from an oil other than a fish oil (e.g., menhaden, sardine, tuna, cod liver, mackerel, herring), an algal oil or other marine oil. Algal groups that produce oils with four double bonds or more include chrysophytes, crytophytes, diatoms, and dinoflagellates (Behrens and Kyle, 1996: J. Food Lipids, 3:259-272) including oils derived from *Crypthecodinium cohnii*, *Nitzchia* sp, *Nannochloropsis*, *Navicula* sp., *Phaedactylum*, *Porphyridium* and *Schizochytrium*.

Additionally, the oil compositions described in section 1.B. can be derived from genetically-modified *Arabidopsis*, canola, carrot, coconut, corn, cotton, flax, linseed, maize, palm kernel, peanut, potato, rapeseed, safflower, soybean, sunflower, and/or tobacco. Finally, the composition of the oils described above can be an unblended oil.

As noted above, humans can synthesize omega-6 and omega-3 polyunsaturated fatty acids from linoleic acid and α-linolenic acid by a $\Delta^6$-desaturation pathway to yield γ-linolenic acid and stearidonic acid, respectively. Further fatty acid elongation and desaturation steps give rise to arachidonic acid, eicosapentaenoic acid, and docosahexaenoic acid. An alternative pathway for the biosynthesis of AA and EPA operates in some organisms. Here, LA and ALA are first elongated specifically to eicosadienoic acid (EDA, C20:2 ω6) and eicosatrienoic acid (EtrA, C20:3 ω3), respectively. Subsequent $\Delta^8$ and $\Delta^5$ desaturation of these products yields AA and EPA.

DHA and EPA can also be synthesized by the polyketide synthase (PKS) pathway from malonyl-CoA precursors. Yazawa, Lipids (1996) 31, S297-S300.

Recent reports demonstrate the reconstitution of these $\Delta^8$-desaturation pathways for polyunsaturated fatty acids synthesis in *Arabidopsis thaliana*, and the accumulation of appreciable quantities of AA and EPA in the transgenic plants (Qi et al., Nature Biotechnol. (2004) 22, 739-745) by sequential transfer and expression of three genes encoding a $\Delta^9$-specific elongating activity from *Isochrysis galbana* (IgASE1) (Qi et al., FEBS Lett. (2002) 510, 159-165), a $\Delta^8$-desaturase from *Euglena gracilis* (Eu$\Delta^8$) (Wallis and Browse, Arch. Biochem. Biophys. J. (1999) 365, 307-316), and a $\Delta^5$-desaturase from *Mortierella alpina* (Mort$\Delta^5$) (Michaelson et al., J. Biol. Chem. (1998) 273, 19055-19059), respectively. Also, Abbadi et al. (Plant Cell (2004) 16, 1-15) has reported the successful seed-specific production of ω3 and ω6 polyunsaturated fatty acids in transgenic tobacco (*Nicotiana tabacum*) and linseed (*Linum usitatissimum*). Pereira et al. (Biochem. J. (2004) 378 (665-671) reported a novel ω3 fatty acid desaturase involved in the biosynthesis of EPA. The methods and compositions of the invention are useful in the extraction and/or stabilization of polyunsaturated fatty acids from organisms produced according to the above listed reports.

Some of the various oils of the present invention can be extracted from plant tissue, including plant seed tissue. Plants from which polyunsaturated fatty acids can be isolated include plants with native levels of polyunsaturated fatty acids as well as plants genetically engineered to express elevated levels of polyunsaturated fatty acids. Examples of plants with native levels of polyunsaturated fatty acids include oilseed crops, such as canola, safflower, and linseed, as well as plants such as flax, evening primrose (*Oenothera biennis*), borage (*Borago officinalis*) and black currants (*Ribes nigrum*), *Trichodesma*, and *Echium*. Certain mosses, for example *Physcomitrella patens*, are known to natively produce polyunsaturated fatty acids that can be extracted and purified according to the methods of the invention. As another example, the methods of the invention are useful for the extraction and/or stabilization of polyunsaturated fatty acid (including for example, stearidonic acid, docosahexaenoic acid, eicosapentaenoic acid, gamma linolenic acid, arachidonic acid, dihomogammalinolenic acid, docosapentaenoic acid, and octadecatetraeonic acid) from plants and/or recombinant plants (including for example, *Arabidopsis*, canola, carrot, coconut, corn, cotton, flax, linseed, maize, palm kernel, peanut, potato, rapeseed, safflower, soybean, sunflower, tobacco, and mixtures thereof) produced with, for example, the compositions and methods of U.S. Pat. Nos. 6,677,145; 6,683,232; 6,635,451; 6,566,583; 6,459,018; 6,432,684; 6,355,861; 6,075,183; 5,977,436; 5,972,664; 5,968,809; 5,959,175; 5,689,050; 5,614,393; 5,552,306; and 5,443,974, as well as WO 02/26946; WO 98/55625; WO 96/21022, and also U.S. Patent App. Ser. Nos. 20040078845; 20030196217; 20030190733; 20030177508; 20030163845; 20030157144; 20030134400; 20030104596; 20030082754; 20020138874; and 20020108147 (the prior references are herein incorporated by reference).

Other oil compositions can be extracted from fungi. Fungi from which polyunsaturated fatty acids can be isolated include fungi with native levels of polyunsaturated fatty acids as well as fungi genetically engineered to express elevated levels of polyunsaturated fatty acids. For example, the methods of the invention are useful for the extraction and/or stabilization of polyunsaturated fatty acid (including stearidonic acid, docosahexaenoic acid, eicosapentaenoic acid, gamma linolenic acid, arachidonic acid, dihomogammalinolenic acid, docosapentaenoic acid, and octadecatetraeonic acid) from fungi and/or recombinant fungi (including for example, *Saccharomyces* (including *S. cerevisiae* and *S. carlsbergensis*), *Candida* spp., *Cunninghamella* spp. (including *C. elegans*, *C. blakesleegna*, and *C. echinulate*), *Lipomyces starkey*, *Yarrowia lipolytica*, *Kluyveromyces* spp., *Hansenula* spp., *Aspergillus* spp., *Penicillium* spp., *Neurospora* spp., *Saprolegnia diclina*, *Trichoderma* spp., *Thamnidium elegans*, *Pichia* spp., *Pythium* spp. (including *P. ultimum*, *P. debaryanum*, *P. irregulare*, and *P. insidiosum*), *Thraustochytrium aureum*, and *Mortierella* spp. (including *M. elongata*, *M. exigua*, *M. hygrophila*, *M. ramanniana*, *M. ramanniana* var. *angulispora*, *M. ramanniana* var. *nana*, *M. alpina*, *M. isabellina*, and *M. vinacea*)) produced with, for example, the compositions and methods of U.S. Pat. Nos. 6,677,145; 6,635,451; 6,566,583; 6,432,684; 6,410,282; 6,355,861; 6,280,982; 6,255,505; 6,136,574; 5,972,664; 5,968,809; 5,658,767; 5,614,393; 5,376,541; 5,246,842; 5,026,644; 4,871,666; and 4,783,408; as well as WO 02/26946; and also U.S. Patent App. Ser. Nos. 20040078845; 20030196217; 20030190733; 20030180898; 20030177508; 20030163845; 20030157144; 20030104596; 20030082754; 20020138874; 20020108147; and 20010046691 (the prior references are herein incorporated by reference).

Yet other oil compositions can be extracted from microorganisms. Microorganisms from which polyunsaturated fatty acids can be isolated include microorganisms with native levels of polyunsaturated fatty acids as well as microorganisms genetically engineered to express elevated levels of polyunsaturated fatty acids. Such microorganisms include bacteria and cyanobacteria. For example, the methods of the invention are useful for the extraction and/or stabilization of polyunsaturated fatty acid (including stearidonic acid, docosahexaenoic acid, eicosapentaenoic acid, gamma linolenic acid, arachidonic acid, dihomogammalinolenic acid, docosapentaenoic acid, and octadecatetraeonic acid) from microorganisms and/or recombinant microorganisms, including for example *E. coli*, Cyanobacteria, *Lactobacillus*, and *Bacillus subtilis*, produced with, for example, the compositions and methods of U.S. Pat. Nos. 6,677,145; 6,635, 451; 6,566,583; 6,432,684; 5,972,664; 5,614,393; and 5,552, 306, as well as WO 02/26946; and also U.S. Patent App. Ser. Nos. 20040078845; 20030180898; 20030177508; 20030163845; 20030157144; 20030104596; 20030082754; 20020138874; 20020108147; and 20010046691 (the prior references are herein incorporated by reference).

Additionally, oil compositions can be extracted from algae. Algae from which polyunsaturated fatty acids can be isolated include algae with native levels of polyunsaturated fatty acids as well as algae genetically engineered to express elevated levels of polyunsaturated fatty acids. Examples of algae with native levels of polyunsaturated fatty acids include *Phaeodactylum tricornutum, Crypthecodinium cohnii, Pavlova, Isochrysis galbana*, and *Thraustochytrium*. For example, the methods of the invention are useful for the extraction and/or stabilization of polyunsaturated fatty acids (including stearidonic acid, docosahexaenoic acid, eicosapentaenoic acid, gamma linolenic acid, arachidonic acid, dihomogammalinolenic acid, docosapentaenoic acid, and octadecatetraeonic acid) from alga and/or recombinant alga produced with, for example, the compositions and methods of U.S. Pat. Nos. 6,727,373; 6,566,583; 6,255,505; 6,136,574; 5,972,664; 5,968,809; 5,547,699; and 5,407,957; and also U.S. Patent App. Ser. Nos. 20040168648; 20030180898; 20030177508; 20030163845; 20030134400; and 20010046691 (the prior references are herein incorporated by reference).

C. Stabilization of High PUFA Seed Oils

Along with enhancement of the oxidative stability of the oil compositions without added stabilizing compounds, the oil compositions can further include stabilizers. Stabilizers, generally, are added to the oil compositions to lengthen the initiation phase and delay the onset of the propagation phase. Stabilizers can delay the onset of the propagation phase by up to about 15 times or more as compared to the time to the propagation phase in an oil having no added stabilizers. Depending on the identity of the particular stabilizer, these compounds can have different modes of action. Some stabilizers chelate metals or other catalytic species that would otherwise interact with the triglycerides of the oil and increase the rate of oxidation of the oil. Other stabilizers act as antioxidant molecules and react with free radical species which could oxidize the fatty acids of the triglycerides to peroxides, which can in turn oxidize with other fatty acids as described in more detail above in section I.A.

Exemplary stabilizers can include 2,4,5-trihydroxybutyrophenone, 2,6-di-t-butylphenol, 3,4-dihydroxybenzoic acid, 3-t-butyl-4-hydroxyanisole, 4-hydroxymethyl-2,6-di-t-butylphenol, 6-ethoxy-1,2-dihydro-2,2,4-trimethylquinoline, anoxomer, ascorbic acid, ascorbyl palmitate, ascorbyl stearate, Beta-apo-8'-carotenoic acid, Beta-Caraotent, butylated hydroxyanisole (BHA), butylated hydroxytoluene (BHT), Caffeic Acid, calcium ascorbate, calcium disodium EDTA, Canthaxanthin, Carnosol, Carvacrol, Catalase, cetyl gallate, Chlorogenic acid, citric acid, clove extract, coffee bean extract, D-α-tocopheryl acetate, dilauryl thiodipropionate, disodium citrate, disodium EDTA, DL-α-tocopherol, DL-α-tocopheryl acetate, dodecyl gallate, dodecyl gallate, D-α-tocopherol, edetic acid, erythorbic acid, Esculetin, Esculin, ethoxyquin, ethyl gallate, ethyl maltol, eucalyptus extract, Ferulic acid, Flavonoids (characterized by a carbon skeleton like C6-C3-C6, typically two aromatic rings linked by a three carbon aliphatic chain which is normally condensed to form a pyran or less commonly a furan ring), Flavones (such as Apigenin, Chrysin, Luteolin), Flavonols (such as Datiscetin, Nyricetin, Daemfero), flavanones, and Chalcones, Fraxetin, fumaric acid, gentian extract, Gluconic acid, glucose oxidase, heptyl paraben, hesperetin, Hydroxycinammic acid, hydroxyglutaric acid, Hydroxytryrosol, isopropyl citrate, lecithin, lemon juice solids, lemon juice, L-tartaric acid, Lutein, Lycopene, Malic acid, maltol, methyl gallate, methylparaben, Morin, N-hydroxysuccinic acid, Nordihydroguaiaretic acid, octyl gallate, P-coumaric acid, phosphatidylcholine, phosphoric acid, P-hydroxybenzoic acid, Phytic acid (inositol hexaphosphate), pimento extract, potassium bisulfite, potassium lactate, potassium metabisulfite, potassium sodium tartrate anhydrous, propyl gallate, Pyrophospate, Quercetin, ice bran extract, rosemary extract (RE), Rosmarinic acid, sage extract, sesamol, Sinapic acid, sodium ascorbate, sodium ascorbate, sodium erythorbate, sodium erythorbate, sodium hypophosphate, sodium hypophosphate, sodium metabisulfite, sodium sulfite, sodium thisulfate pentahydrate, Sodium tryphosphate, soy flour, Succinic acid, sucrose, Syringic acid, Tartaric acid, t-butyl hydroquinone (TBHQ), Thymol, tocopherol, tocopheryl acetate, tocotrienols, trans-Resveratrol, Tyrosol, Vanillic acid, wheat germ oil, Zeaxanthin, α-terpineol, and combinations thereof.

A series of studies was completed (see Examples 1-3) to determine leading stabilizers or stabilizer combinations for the oil compositions of the invention. These stabilizers can be selected from the group consisting of citric acid (CA), ascorbyl palmitate (AP), t-butyl hydroquinone (TBHQ), propyl gallate (PG), and combinations thereof. In various preferred embodiments, the stabilizer in the oil is CA, TBHQ, and combinations thereof. In various alternative embodiments, the stabilizer in the oil is AP, PG, and combinations thereof. In other preferred embodiments, the stabilizer in the oil is Citric acid is added to the oil compositions in a concentration from about 1 ppm to about 100 ppm; preferably, from about 20 ppm to about 80 ppm; more preferably from about 40 ppm to about 60 ppm. Ascorbyl palmitate is added to the oil compositions in a concentration from about 50 ppm to about 1000 ppm; preferably, from about 100 ppm to about 750 ppm; more preferably from about 400 ppm to about 600 ppm. TBHQ is added to the oil compositions in a concentration from about 10 ppm to about 500 ppm; preferably, from about 50 ppm to about 200 ppm; more preferably from about 100 ppm to about 140 ppm. Propyl gallate is added to the oil compositions in a concentration from about 10 ppm to about 120 ppm; preferably, from about 50 ppm to about 120 ppm; more preferably from about 100 ppm to about 120 ppm. Combinations of two or more of these stabilizers will have concentrations of each stabilizer falling within the above ranges.

In some of these studies, an accelerated aging protocol using a novel thin film IR method was used. This method of determining oxidative stability of oils comprises preparing an oil composition in an inert atmosphere; placing a layer of the oil composition on an infrared card to form a treated infrared card; placing the treated infrared card in an inert atmosphere for a period sufficient for the layer to have a substantially uniform thickness; exposing the infrared card with the layer of substantially uniform thickness to air; and periodically collecting the infrared spectrum of the oil composition. Specific aspects of this method are described in more detail in Example 3. In various embodiments of this method, the infrared card with the layer of substantially uniform thickness is stored at from about 25° C. to about 80° C., preferably, about 50° C. to about 70° C., even more preferably, from about 55° C. to about 65° C. between collection of infrared spectra. In other aspects of the method, the infrared spectra are collected about 12 hours to about 36 hours, preferably about 24 hours, apart.

Another aspect of the invention is a method for decreasing the anisidine value (AV) of oils. Anisidine value is an important parameter that can help maximize oil stability for successful formulation of easily oxidized oils having high levels of unsaturation in food products. A novel method of reducing the AV of a refined, bleached, deodorized oil (an RBD oil) having an AV greater than about 1 has been discovered and is described in more detail below and in Example 4. Generally, the method comprises treating an oil composition with an AV-lowering agent capable of associating with aldehydes and/or ketones within the oil composition and physically separating the AV-lowering agent from the oil composition to remove the aldehydes and/or ketones associated with the AV-lowering agent from the oil composition and lower the AV. The AV-lowering agent comprises an amine attached to a support capable of being physically separated from the oil composition.

This method of reducing AV in a RBD oil exploits the unique functionality of the non-volatile aldehydes and ketones left in the RBD oil upon decomposition of peroxides and hydroperoxides. Specifically, the non-volatile aldehydes and ketones react with an amine to form a substituted imine through a condensation reaction (a substituted imine is sometimes called a Schiff base). The aldehydes and ketones can be removed from the oil composition by tethering the amine to a support that can be physically separated from the oil composition. In various embodiments, this support is an insoluble support or a macroscopic support. Once the reaction is complete, the non-volatile aldehydes and ketones (now in the form of substituted imines) can be physically removed from the oil via filtration because they are attached to the insoluble support.

The method described above can be used to remove aldehydes and ketones in a variety of oils, for example, plant oils, fish oils, petroleum oils, cooking oils, frying oils, coating oils, and combinations thereof.

In addition to the variety of oils the method is useful for, there are a variety of amines and support materials that are suitable for use in the method. For example, the amine can be an aliphatic or aryl amine, preferably, the amine is an aryl amine. The support can be selected from a variety of insoluble particles including polystyrene, styrene-divinylbenzene copolymers, poly(ethylene glycol)-polystyrene graft polymers, poly(ethylene glycol), polyacrylamides, polyacrylamide-PEG copolymers, silica, polysaccharides, and combinations thereof. In various preferred embodiments, the support comprises polystyrene, particularly polystyrene resin beads.

This treatment procedure could be utilized at any step during the oil refining process. The resin can be regenerated or used and discarded. Preferably, the resin is regenerated; this is accomplished by hydrolysis of the pendent imine with hot acidic water. This regeneration would allow the resin to be dried and used for the removal of more non-volatile aldehydes and ketones. Both the formation of the substituted imine and the regeneration of the resin could be performed in a packed column or a stirred tank reactor.

D. Sensory Characteristics of High PUFA Seed Oils

Generally, the SDA containing oils of the invention have a low total impact. Thus, another aspect of the present invention is an oil composition comprising at least about 0.4, 1, 2, 4, 6, 8, 10, 12, 14, 15, 16, 17, 18, 19, 20 wt. % or more of at least one polyunsaturated fatty acid having four or more carbon-carbon double bonds or a derivative thereof based upon the total weight of fatty acids or derivatives thereof in the composition, the composition having an aroma total impact score of up to about 2.5, wherein total impact is determined by a standardized sensory evaluation.

Yet another aspect is an oil composition comprising at least about 0.4, 1, 2, 4, 6, 8, 10, 12, 14, 15, 16, 17, 18, 19, 20 wt. % or more of at least one polyunsaturated fatty acid having four or more carbon-carbon double bonds or a derivative thereof based upon the total weight of fatty acids or derivatives thereof in the composition, the composition having an aromatics/flavor total impact score of up to about 2.5, wherein total impact is determined by a standardized sensory evaluation.

In addition to having a low total impact, the oils of the invention have a low fishy and/or pondy/algal aroma. Thus, a further aspect is an oil composition comprising at least about 0.4, 1, 2, 4, 6, 8, 10, 12, 14, 15, 16, 17, 18, 19, 20 wt. % or more of a polyunsaturated fatty acid having four or more carbon-carbon double bonds and 18 carbon atoms or less, or a derivative thereof, based upon the total weight of fatty acids or derivatives thereof in the composition, the composition having a fishy aroma score of up to about 0.5, 1, 1.5, 2, 2.5, 3, 3.5, 4, or 4.5, wherein fishy aroma is determined by a standardized sensory evaluation.

Yet another aspect is an oil composition comprising at least about 0.4, 1, 2, 4, 6, 8, 10, 12, 14, 15, 16, 17, 18, 19, 20 wt. % or more of a polyunsaturated fatty acid having four or more carbon-carbon double bonds and 18 carbon atoms or less, or a derivative thereof, based upon the total weight of fatty acids or derivatives thereof in the composition, the composition having a fishy/pondy complex aroma score of up to about 0.5, 1, 1.5, 2, 2.5, wherein fishy/pondy complex aroma is determined by a standardized sensory evaluation.

Yet another aspect of the invention is an oil composition comprising less than about 1, 5, 10, 12, 14, 16, 18, 20, 22, 24, 26, 28, 30, 32, 34 wt. % of a polyunsaturated fatty acid having six carbon-carbon double bonds and 22 carbon atoms, or a derivative thereof, based upon the total weight of fatty acids or derivatives thereof in the composition, the composition having a pondy aroma score of up to 0.5, 1, 1.5, 2, 2.5, wherein pondy aroma is determined by a standardized sensory evaluation.

Further, the oil compositions of the invention do not have a significant change in attributes over time. For example, an oil composition comprising at least about 0.4, 1, 2, 4, 6, 8, 10, 12, 14, 15, 16, 17, 18, 19, 20 wt. % or more of at least one polyunsaturated fatty acid having four or more carbon-carbon double bonds or a derivative thereof based upon the total weight of fatty acids or derivatives thereof in the composition, the composition having a difference in aroma total impact score difference of less than about 0.5, or 1.0 when comparing the oil evaluated at an initial time and the same oil stored for up to about 1, 2, or more months.

Another aspect is an oil composition comprising at least about 0.4, 1, 2, 4, 6, 8, 10, 12, 14, 15, 16, 17, 18, 19, 20 wt. % or more of at least one polyunsaturated fatty acid having four or more carbon-carbon double bonds or a derivative thereof based upon the total weight of fatty acids or derivatives thereof in the composition, the composition having a difference in aromatics/flavor total impact score difference of less than about 0.5, or 1.0 when comparing the oil evaluated at an initial time and the same oil stored for up to about 1, 2, or more months.

For each of the various aspects described above, the oil compositions can be stabilized or unstabilized. Stabilized oil compositions are described in more detail above.

II. Process for Preparing Oil Compositions

Generally, the following steps are used to process seed oils: preparation, cracking and dehulling, conditioning, milling, flaking or pressing, extracting, degumming, refining, bleaching and deodorizing. Each of these steps will be discussed in more detail herein below. The discussion details the process for each of the steps used currently in commercial application. A person of ordinary skill would know that the steps could be combined, used in a different order or otherwise modified.

Generally, the preparation step includes the initial cleaning process, which removes stones, dirt, sticks, worms, insects, metal fragments, and other debris collected during the harvest and storage of the seeds. Extraneous matter as described above can affect the quality of the final seed oil by containing compounds that negatively impact its chemical stability. Preferably, ripe, unbroken seeds having reduced levels of chlorophyll and reduced levels of free fatty acids are used.

After the preparation step, the seeds are cracked and dehulled. Cracking and dehulling can be accomplished in a variety of ways, which are well known in the art. For example, the seeds can be cracked and dehulled using a seed cracker, which mechanically breaks the seeds and releases hulls and directly exposes the inner seed meat to air. After cracking, the hulls can be separated from the seed meats by a dehuller. In one aspect, the dehuller can separate the hulls from the seed meats due to the density difference between the hulls and the seeds; the hulls are less dense than the seed meats. For example, aspiration will separate the hulls from the cracked seed meats. Dehulling reduces the crude fiber content, while increasing the protein concentration of the extracted seed meats. Optionally, after dehulling, the hulls can be sieved to recover the fines generated in the cracking of the seeds. After recovery, the fines can be added back to the seed meats prior to conditioning.

Once the seeds are cracked, the oxygen exposure of the seed meats can optionally be minimized, which would reduce oil oxidation and improve oil quality. Furthermore, it will be understood by persons skilled in the art that minimization of oxygen exposure may occur independently at each of the subsequently disclosed oilseed processing steps.

Once the seeds are cracked and dehulled, they are conditioned to make the seed meats pliable prior to further processing. Furthermore, the conditioning ruptures oil bodies. Further processing, in terms of flaking, grinding or other milling technology is made easier by having pliable seed meats at this stage. Generally, the seed meats have moisture removed or added in order to reach a 6-10 wt. % moisture level. If moisture is removed, this process is called toasting and if moisture is added, this process is called cooking. Typically, the seed meats are heated to 40-90° C. with steam which is dry or wet depending on the direction of adjustment of the moisture content of the seed meats. In some instances, the conditioning step occurs under conditions minimizing oxygen exposure or at lower temperatures for seeds having high PUFA levels.

Once the seed meats are conditioned, they can be milled to a desired particle size or flaked to a desired surface area. In certain cases, the flaking or milling occurs under conditions minimizing oxygen exposure. Flaking or milling is done to increase the surface area of the seed meats and also rupture the oil bodies thereby facilitating a more efficient extraction. Many milling technologies are appropriate and are well known in the art. The considerations when choosing a method of milling and a particle size for the ground seed are contingent upon, but not limited to the oil content in the seed and the desired efficiency of the extraction of the seed meats or the seed. When flaking the seed meats, the flakes are typically from about 0.1 to about 0.5 mm thick; from about 0.1 to about 0.35 mm thick; from about 0.3 to about 0.5 mm thick; or from about 0.2 to about 0.4 mm thick.

Optionally, after the seed meats are milled, they can be pressed. Typically, the seed meats are pressed when the oil content of the seed meats is greater than about 30 wt. % of the seeds. However, seeds with higher or lower oil contents can be pressed. The seed meats can be pressed, for example, in a hydraulic press or mechanical screw. Typically, the seed meats are heated to less than about 55° C. upon the input of work. When pressed, the oil in the seed meats is pressed through a screen, collected and filtered. The oil collected is the first press oil. The seed meats from after pressing are called seed cake; the seed cake contains oil and can be subjected to solvent extraction.

After milling, flaking or optional pressing, the oil can be extracted from the seed meats or seed cake by contacting them with a solvent. Preferably, n-hexane or iso-hexane is used as the solvent in the extraction process. Typically, the solvent is degassed prior to contact with the oil. This extraction can be carried out in a variety of ways, which are well known in the art. For example, the extraction can be a batch or continuous process and desirably is a continuous counter-current process. In a continuous counter-current process, the solvent contact with the seed meat leaches the oil into the solvent, providing increasingly more concentrated miscellas (i.e., solvent-oil), while the marc (i.e., solvent-solids) is contacted with miscellas of decreasing concentration. After extraction, the solvent is removed from the miscella in a manner well known in the art. For example, distillation, rotary evaporation or a rising film evaporator and steam stripper can be used for removing the solvent. After solvent removal, if the crude oil still contains residual solvent, it can be heated at about 95° C. and about 60 mmHg.

The above processed crude oil contains hydratable and nonhydratable phosphatides. Accordingly, the crude oil is degummed to remove the hydratable phosphatides by adding water and heating to from about 40 to about 75° C. for approximately 5-60 minutes depending on the phosphatide concentration. Optionally, phosphoric acid and/or citric acid can be added to convert the nonhydratable phosphatides to hydratable phosphatides. Phosphoric acid and citric acid form metal complexes, which decreases the concentration of metal ions bound to phosphatides (metal complexed phosphatides are nonhydratable) and thus, converts nonhydratable phosphatides to hydratable phosphatides. Optionally, after heating with water, the crude oil and water mixture can be centrifuged to separate the oil and water, followed by removal of the water layer containing the hydratable phosphatides. Generally, if phosphoric acid and/or citric acid are added in the degumming step, about 1 wt. % to about 5 wt. %; preferably, about 1 wt. % to about 2 wt. %; more preferably, about 1.5 wt. % to about 2 wt. % are used. This process step is optionally carried out by degassing the water and phosphoric acid before contacting them with the oil.

Furthermore, the crude oil contains free fatty acids (FFAs), which can be removed by a chemical (e.g., caustic) refining step. When FFAs react with basic substances (e.g., caustic) they form soaps that can be extracted into aqueous solution. Thus, the crude oil is heated to about 40 to about 75° C. and NaOH is added with stirring and allowed to react for approximately 10 to 45 minutes. This is followed by stopping the stirring while continuing heat, removing the aqueous layer, and treating the neutralized oil to remove soaps. The oil is treated by water washing the oil until the aqueous layer is of neutral pH, or by treating the neutralized oil with a silica or ion exchange material. The oil is dried at about 95° C. and about 10 mmHg. In some instances, the caustic solution is degassed before it contacts the oil.

Alternatively, rather than removing FFAs from the oil by chemical refining, the FFAs can be removed by physical refining. For example, the oil can be physically refined during deodorization. When physical refining is performed, the FFAs are removed from the oil by vacuum distillation performed at low pressure and relatively higher temperature. Generally, FFAs have lower molecular weights than triglycerides and thus, FFAs generally have lower boiling points and can be separated from triglycerides based on this boiling point difference and through aid of nitrogen or steam stripping used as an azeotrope or carrier gas to sweep volatiles from the deodorizers.

Typically, when physical refining rather than chemical refining is performed, oil processing conditions are modified to achieve similar final product specifications. For example, when an aqueous acidic solution is used in the degumming step, a higher concentration of acid (e.g., up to about 100% greater concentration, preferably about 50% to about 100% greater concentration) may be needed due to the greater concentration of non-hydratable phosphatides that could otherwise be removed in a chemical refining step. In addition, a greater amount of bleaching material (e.g., up to about 100% greater amount, preferably about 50 to about 100% greater amount) is used.

Before bleaching citric acid (50 wt. % solution) can be added at a concentration of about 0.01 wt. % to about 5 wt. % to the degummed oil and/or chemically refined oil. This mixture can then be heated at a temperature of about 35° C. to about 65° C. and a pressure of about 1 mmHg to about 760 mmHg for about 5 to about 60 minutes.

The degummed oil and/or chemically refined oil is subjected to an absorption process (e.g., bleached) to remove peroxides, oxidation products, phosphatides, keratinoids, chlorphyloids, color bodies, metals and remaining soaps formed in the caustic refining step or other processing steps. The bleaching process comprises heating the degummed oil or chemically refined oil under vacuum of about 0.1 mmHg to about 200 mmHg and adding a bleaching material appropriate to remove the above referenced species (e.g., neutral earth (commonly termed natural clay or fuller's earth), acid-activated earth, activated clays and silicates) and a filter aid, whereupon the mixture is heated to about 75-125° C. and the bleaching material is contacted with the degummed oil and/or chemically refined oil for about 5-50 minutes. It can be advantageous to degas the bleaching material before it contacts the refined oil. The amount of bleaching material used is from about 0.25 wt. % to about 3 wt. %, preferably about 0.25 wt. % to about 1.5 wt. %, and more preferably about 0.5 wt. % to about 1 wt. %. After heating, the bleached oil or refined, bleached oil is filtered and deodorized.

The bleached oil or refined, bleached oil is deodorized to remove compounds with strong odors and flavors as well as remaining free fatty acids. The color of the oil can be further reduced by heat bleaching at elevated temperatures. Deodorization can be performed by a variety of techniques including batch and continuous deodorization units such as batch stir tank reactors, falling film evaporators, wiped film evaporators, packed column deodorizers, tray type deodorizers, and loop reactors. Typically, a continuous deodorization process is preferred. Generally, deodorization conditions are performed at about 160 to about 270° C. and about 0.002 to about 1.4 kPa. For a continuous process, particularly in a continuous deodorizer having successive trays for the oil to traverse, a residence time of up to 2 hours at a temperature from about 170° C. to about 265° C.; a residence time of up to about 30 minutes at a temperature from about 240° C. to about 250° C. is preferred. Deodorization conditions can use carrier gases for the removal of volatile compounds (e.g., steam, nitrogen, argon, or any other gas that does not decrease the stability or quality of the oil).

Furthermore, when physical rather than chemical refining is used, a greater amount of FFAs are removed during the deodorization step, and the deodorizer conditions are modified to facilitate the removal of free fatty acids. For example, the temperature is increased by about 25° C.; oils can be deodorized at temperatures ranging from about 165° C. to about 300° C. In particular, oils can be deodorized at temperatures ranging from about 250° C. to about 280° C. or about 175° C. to about 205° C. In addition, the retention time of the oil in the deodorizer is increased by up to about 100%. For example, the retention time can range from less than about 1, 5, 10, 30, 60, 90, 100, 110, 120, 130, 150, 180, 210 or 240 minutes. Additionally, the deodorizer pressure can be reduced to less than about $3\times10^{-4}$, $1\times10^{-3}$, $5\times10^{-3}$, 0.01, 0.02, 0.03, 0.04, 0.05, 0.06, 0.07, 0.08, 0.09, or 0.1 kPa. The deodorization step results in a refined, bleached and deodorized (RBD) oil.

Optionally, RBD oils can be stabilized by partial hydrogenation and/or by the addition of stabilizers or by minimizing the removal or degradation of microcomponents that aid in maintaining oil stability and quality. Partial hydrogenation stabilizes an oil by reducing the number of double bonds in the fatty acids contained in the oil and thus, reducing the chemical reactivity of the oil. However, partial hydrogenation can increase the concentration of undesirable trans-fatty acids.

Stabilizers generally act to intercept free radicals formed during oxidation. Interception of the free radicals by stabilizers, which become either more stable free radicals or rearrange to become stable molecules, slows the oxidation of the oil due to the decreased concentration of highly reactive free radicals that can oxidize more fatty acid units.

For each of the above steps in section II., at each step the exposure to oxygen was optionally minimized, the exposure to heat was optionally minimized, the exposure to UV light was optionally minimized and optionally, stabilizers were added to the seed meats or seed oil before, during, or after processing. These and other process improvements for preparing oils of the present invention are described and exemplified in U.S. patent application Ser. No. 11/267,810 entitled "Processes for Preparation of Oil Compositions" filed Nov. 4, 2005, which is incorporated by reference herein in its entirety.

III. Handling and Storage of Oil Compositions

Generally, when storing oil compositions it is advantageous to minimize further oxidation of the fatty acids. One oxidation reactant is singlet oxygen, which is generated by light and a photosensitizer. Singlet oxygen reacts at rates orders of magnitude greater than triplet oxygen. Thus, one way to minimize further oxidation is to store the oils in the dark or in substantially opaque containers, keep them at a moderate temperature and preferably, in the presence of an inert gas. Preferably, the oil has stability characteristics, which paired with storage conditions and/or stabilizers, will inhibit the reversion of the oil's flavor, odor, color, and the like.

Oil compositions described above in section I. typically have advantageous storage stability characteristics. For example, in one embodiment, a process for maintaining the storage stability of an oil during shipment or storage comprises storing an oil described in section I. in a container at a temperature ranging from about 4 to about 45° C. for at least one month, wherein the oil has an anisidine value of less than 3 after storage. In another embodiment, a process for maintaining the storage stability of an oil during shipment or storage comprises storing an oil of the invention in a container at a temperature ranging from about 4 to about 45° C. for at least one month, wherein the absolute change in the anisidine value of the oil during storage is no more than about 0.05, 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10, 11, 12, 13, 14, 15, 16, 17, 18, 19 or 20. Further, the oil can be stored in an oxygen-free or reduced-oxygen atmosphere. Preferably, the oil can be stored at about room temperature; preferably, the oil can be stored at about room temperature for about 2, 3, 4, 5, 6, 7, 8, 9, 10, 11 or 12 months or more. Alternatively, the oil can be stored under refrigeration for at least one month; further, the oil can be stored under refrigeration for about 2, 3, 4, 5, 6, 7, 8, 9, 10, 11 or 12 months or more. In another embodiment, the oil is derived from a source other than a marine oil, such as fish, algae, or krill. In a further embodiment of the process of this section, the oil is derived from a plant oil other than blackcurrant oil, borage oil, *Echium* oil, evening primrose oil, gooseberry oil, hemp oil, or redcurrant oil.

The process described above in section II. can further comprise addition of a stabilizer to the oil prior to or during storage. The stabilizer can comprise at least one complexing agent or at least one antioxidant. In one exemplary embodiment, the stabilizer comprises citric acid, TBHQ, ascorbyl palmitate, propyl gallate, or derivatives or combinations thereof.

IV. Food Products

Food products can be prepared comprising any one of the oil compositions described above in section I. In particular, the food composition can comprise a food product or food analog comprising a spray-dried or freeze-dried food particle, an extruded food, a meat product, a meat analog, a cereal product, a snack food, a baked good, a health food, a fried food, a dairy product, a cheese analog, a milk analog, a pet food, an animal feed or an aquiculture feed. In another embodiment, the food product is a beverage; the beverage can be an adult nutritional formula, an infant formula, a juice, a milk drink, a soymilk, a yogurt drink, smoothie, or a reconstitutable dry-powder such as a non-dairy creamer. Further, the food product can be a nutritional supplement, a spread, a margarine, a salad dressing, a cooking oil, a refrigerated dough product, a microwave popcorn, a dairy product such as yogurt, cheese, cream cheese, sour cream or mayonnaise, a baked good such as bread, rolls, cakes, pastries, cookies, muffins or crackers, an entree, a side dish, a soup, a sauce, granola, a cereal, a snack bar, a nutritional bar, or a confectionary.

One advantage of the oils containing four or more double bonds made from the process of this invention is that they are bland in odor and flavor. They also can be stored at room temperature for a period of time while retaining their flavor and sensory properties. In addition, they have the advantage of being able to be stored under refrigeration while still remaining bland. These oils can also be encapsulated or frozen by methods well known in the art for fish oil stabilization.

Having described the invention in detail, it will be apparent that modifications and variations are possible without departing the scope of the invention defined in the appended claims. Furthermore, it should be appreciated that all examples in the present disclosure are provided as non-limiting examples.

EXAMPLES

Example 1

Accelerated Aging of Oils

A solution of each stabilizer was prepared in propylene glycol. The solution was vortexed on high for 5 minutes. In a nitrogen purged glove bag, the appropriate amount of each solution was added to 2.5 g (2.77 ml) test oils in 60 cc glass amber bottles with Teflon lids to yield a mixture. These mixtures were then vortexed on high for 1 minute. Portions of these mixtures were then removed with a plastic pipette and added to amber vials.

Unspiked samples of the neat oils were also prepared as described above (with out adding stabilizer). Each stabilizer was added at the following concentration: citric acid (CA) at 50 ppm, ascorbyl palmitate (AP) at 400 ppm, and t-butyl hydroquinone (TBHQ) at 120 ppm.

The vials (that contained neat oil and oil spiked with stabilizer(s)) were then opened in air until the headspace in the vials was sufficiently exchanged. The vials were recapped and then were heated to 55° C. in a water bath. Samples were taken and the peroxide values were measured at different time intervals. Generally, the aging of a sample stored for one day at 55° C. is equivalent to the aging of a sample stored for approximately 10 days at room temperature (~20-25° C.). Test oils having 20 wt. % SDA and prepared using the process conditions of examples 45 and 46 described in U.S. patent application Ser. No. 11/267,810 entitled "Processes for Preparation of Oil Compositions" filed Nov. 4, 2005, were aged using the above protocol. The results of this aging study are present in the graph of FIG. 1. Three oils with single additives (CA, AP, and TBHQ) and two with binary additives (CA+AP and CA+TBHQ) were evaluated. The SDA oil with citric acid transitions from initiation phase (IP) to propagation phase (PP) after two days. FIG. 1 shows a plot of the AV vs. time. This plot shows a longer IP (about 8 days) for the oil with added ascorbyl palmitate and a longer IP (about 10 days) for the oil with added TBHQ, than for the oil with added CA. The oil with added TBHQ was the best single added stabilizer for this particular oil.

FIG. 1 also shows the oxidation of oils having added AP and CA and added TBHQ and CA. The oil having added AP and CA showed an IP that was shorter than the oil having added AP only. The oil having added TBHQ and CA had the longest IP of any oil tested in this experiment.

Example 2

Aging Studies at 55° C. and 25° C.

Figure 2A:
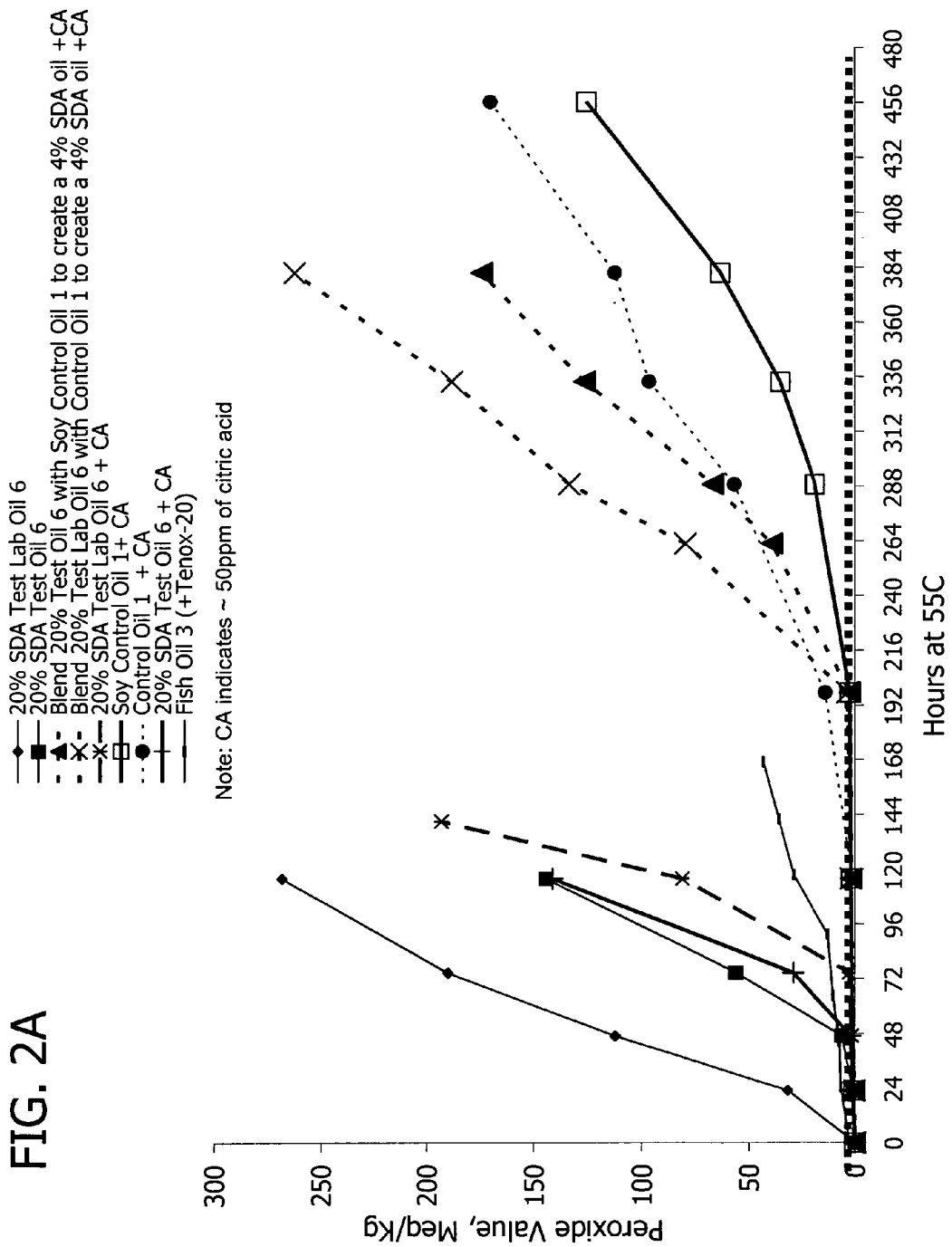
FIG. 2A is a graph of PV vs. time for 20% SDA, 4% SDA blend, 20% SDA with citric acid, and control soy oil compositions. The graph of FIG. 2 shows the results of an accelerated aging test carried out at 55° C.
Figure 2B:
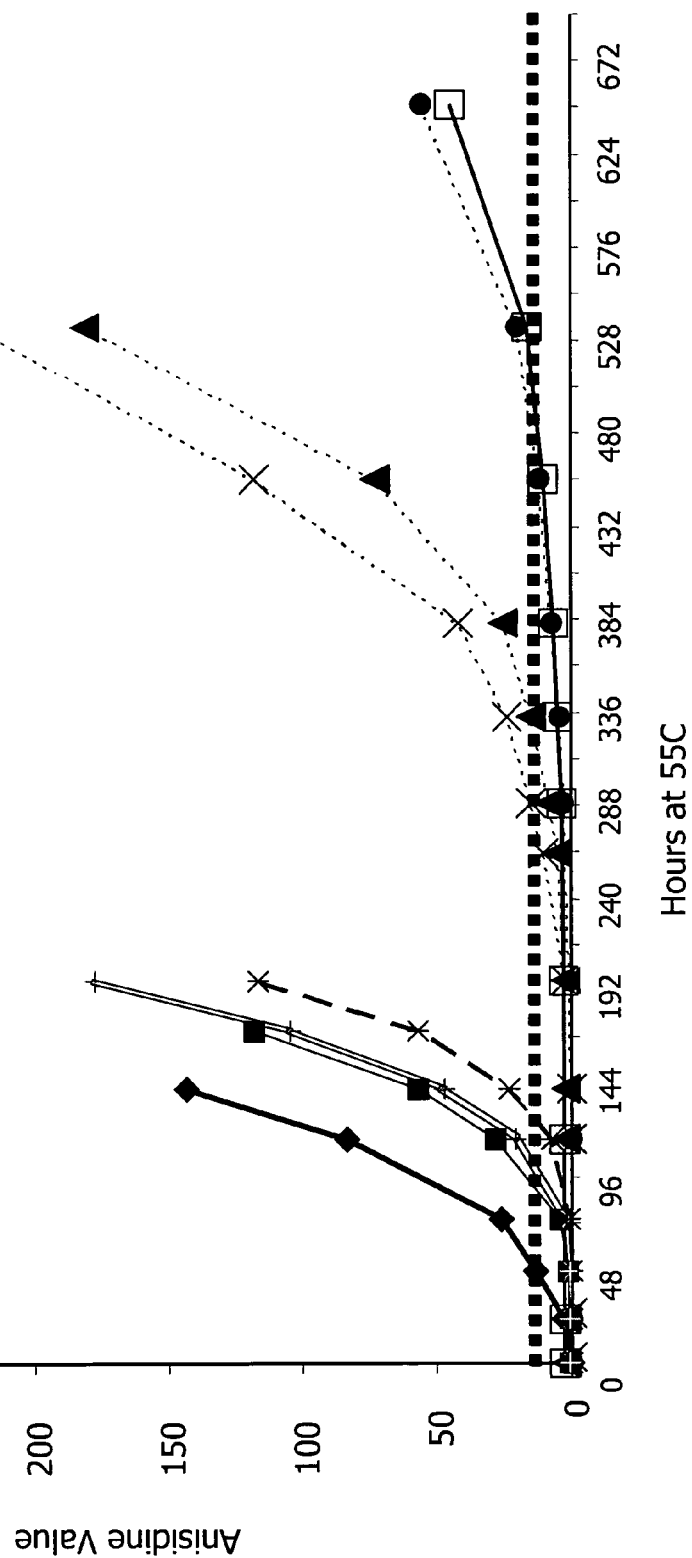
FIG. 2B is a graph of AV vs. time for 20% SDA, 4% SDA blend, 20% SDA with citric acid, and control soy oil compositions. The graph of FIG. 2 shows the results of an accelerated aging test carried out at 55° C.
Figure 3A:
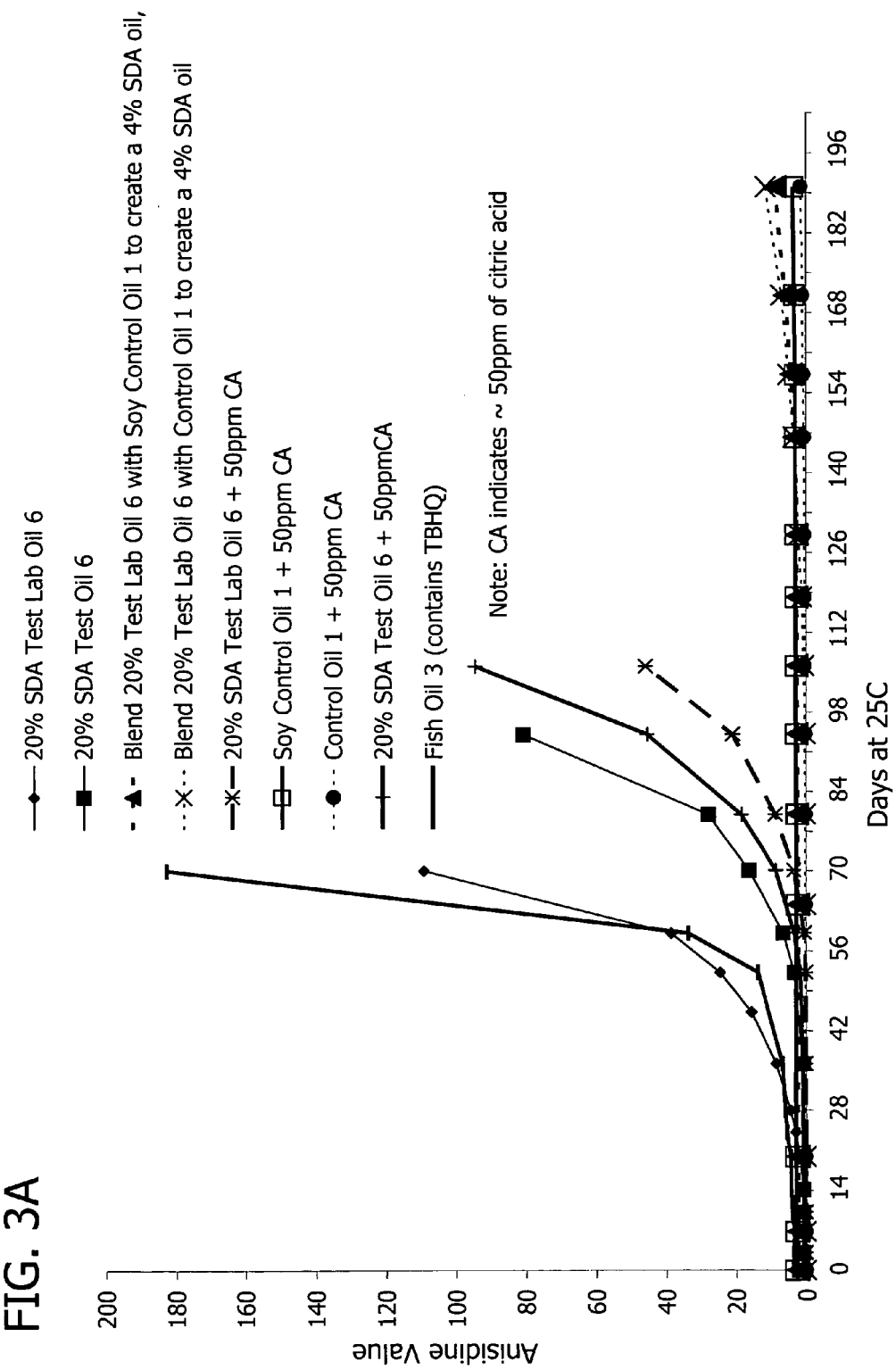
FIG. 3A is a graph of PV vs. time for 20% SDA, 4% SDA blend, 20% SDA with citric acid, and control soy oil compositions. The graph of FIG. 3 shows the results of a room temperature aging test carried out at 25° C.

The oils included in this study were: 20% SDA Test Article (TA) processed at lab scale and pilot scale (PS), nulls that were isolines, and thus, were SDA negative (prepared using the process conditions of examples 45 and 46 described in U.S. patent application Ser. No. 11/267,810 entitled "Processes for Preparation of Oil Compositions" filed Nov. 4, 2005, and a soy control oil 1. In addition, the 20% SDA oil was blended with either the soy control oil 1 or the null oil to generate a 4% SDA oil blend. A relative ranking in the stability of these oils based on the PV and AV vs. time at 55° C. starting with the least stabile oil is: TA-Lab<TA-(PS)<TA-PS with CA<TA-Lab with CA<<4% blend (TA-PS Nulls) with CA<4% blend (TA-PS plus soy control oil 1) with CA<Nulls<soy control oil 1 (See FIG. 2). Relative ranking of the stabilities was determined by comparison of the time at which the PV or AV value crossed 10. In general, this is where the transition from initiation into the propagation phase begins.) At 25° C. (see FIG. 3), five of the oils have transitioned from the initiation to propagation phase (via AV) and they show significant qualitative and quantitative similarities to the relative position of the data generated at 55° C.

Figure 4:
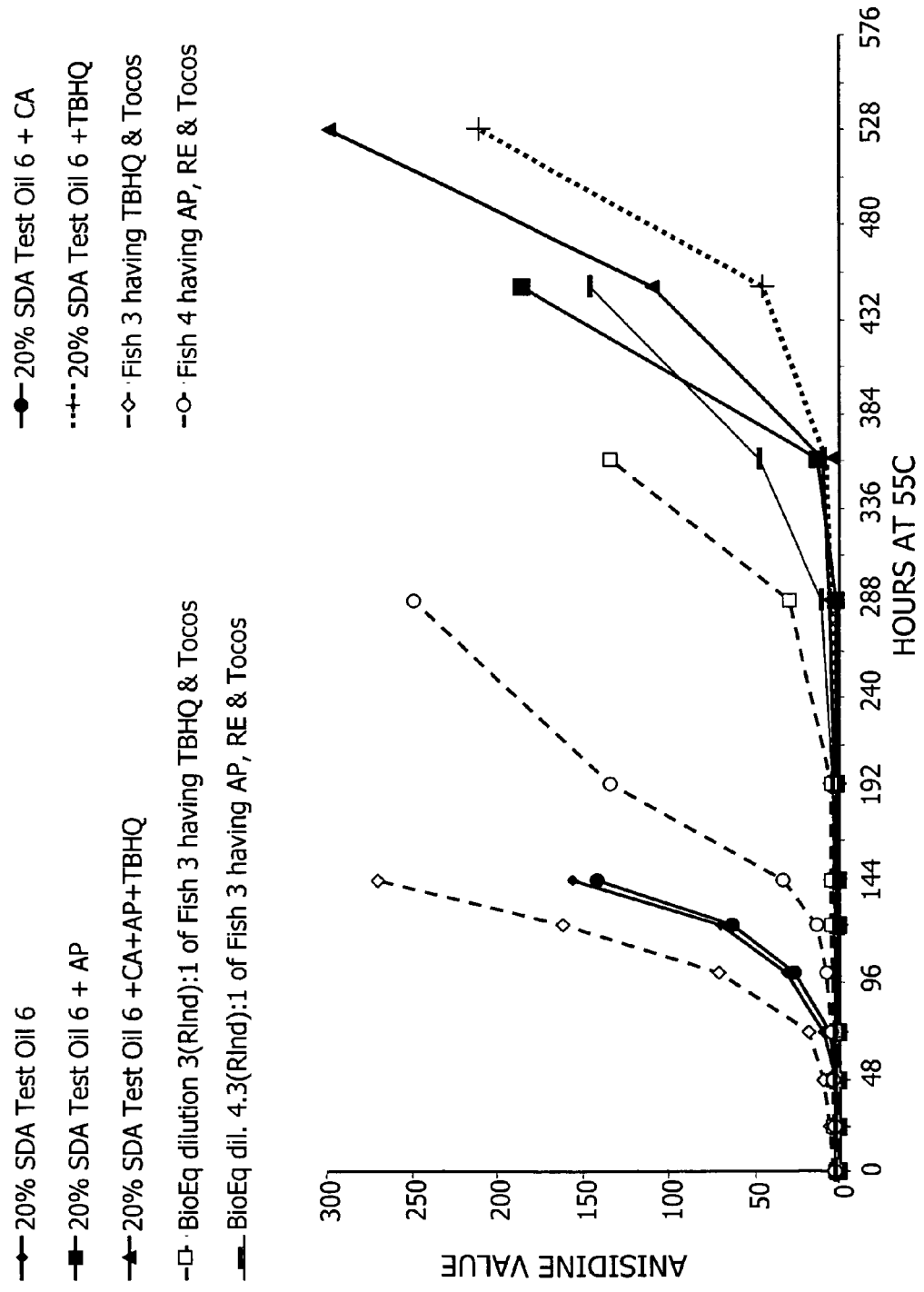
FIG. 4 is a graph of AV vs. time for 20% SDA, 20% SDA and citric acid, commercial fish, and bioequivalent SDA blend oil compositions. The graph of FIG. 4 shows the results of an accelerated aging test carried out at 55° C.

Another accelerated aging study at 55° C. was carried out using the 20% SDA Test Article spiked with citric acid (50 ppm), ascorbyl palmitate (400 ppm), and TBHQ (120 ppm). One sample contained a mixture of all three stabilizers in these amounts. In addition, commercial fish oil products like fish oil 3 (with TBHQ and tocopherols) and fish oil 4 (with ascorbyl palmitate and tocopherols) were included as controls. In order to further assess these commercial fish oil products, they were blended with soy control oil 1 to give EPA+DHA bioequivalency to the SDA oil. For every three SDA molecules consumed, one EPA molecule is produced. Thus, if it is assumed that EPA, DPA and DHA are equal in bioefficacy, in order to produce the same amount of EPA, three times more SDA than EPA must be consumed. The sum of the omega three fatty acids was determined for each fish oil and each oil was diluted with soy oil to a 6.67 wt. % solution to make a direct comparison with a 20 wt. % SDA oil. FIG. 4 shows the AV vs. time for these oils. Initial AV results show that 20% SDA oils stabilized with AP, TBHQ, and the combination of AP, TBHQ, and CA have longer initiation phases than fish oil 3 and fish oil 4, including their bioequivalent dilutions.

| Relative % | Soy control 1 | Fish 3 | Fish 4 |
|---|---|---|---|
| C12:0 | | | |
| C14:0 | | 9.03 | 7.29 |
| C16:0 | 11.01 | 20.47 | 17.73 |
| C16:1 | 0 | 12.38 | 6.97 |
| C18:0 | 3.72 | 3.93 | 3.33 |
| C18:1 n9 | 21.04 | 8.94 | 10.52 |
| C18:1 n7 | | 3.63 | 2.48 |
| C18:2 | 55.32 | 1.64 | 1.42 |
| C18:3 n6 | | | |
| C18:3 n3 | 6.43 | 1.76 | 1.2 |
| C18:4 n3 | | 3.05 | 3.43 |
| C20:0 | 0.32 | | |
| C20:1 | 0.2 | 1.57 | |
| C20:5 n3 | | 12.54 | 13.04 |
| C22:0 | 0.36 | | 1.58 |
| C22:5 n3 | | 2.57 | 16.76 |
| C22:6 n3 | | 12.55 | |
| C24:0 | | | |

Example 3

IR Thin Film Oxidation Studies

The method for the accelerated aging of oils and evaluation of oxidative stability was adapted from a published method from McGill University (*J. Am. Oil. Chem. Soc.,* 2003, 80, 635-41; *J. Am. Oil. Chem. Soc.,* 2004, 81, 111-6). The method was adapted in order to protect the oils from air during their preparation and ensure a consistent film thickness. The oil films were prepared on PTFE films (polytetrafluoroethylene, such as Teflon®) mounted in a rectangular cardboard card, which were conveniently mounted in an IR spectrometer. Cards were purchased from International Crystal Laboratories, Garfield, N.J., part no. 0006-7363.

The oil formulation for testing was prepared under argon in a glovebox. Typically, 0.2-0.5 g. was placed in a vial, which was then sealed and removed from the drybox. At least two infrared cards were labeled for each sample and laid out on tissue to avoid contamination. A thick layer of the oil was then brushed onto the labeled cards using artificial fiber (not camel's hair) brushes. Because the Teflon supporting film contains cracks, some oil soaked through onto the supporting tissue. To avoid excessive air exposure, the cards were then immediately laid flat on fresh tissue inside a box. The box was transferred to a vacuum chamber, which was immediately evacuated and refilled with argon. The box of cards was held overnight in the chamber, in the dark. During this time, any excessive oil soaked through to the tissue yielding an oil film with a consistent thickness.

The following day, the infrared spectrum of each card was taken using a Nicolet Model 550 Fourier transform infrared spectrometer controlled by Nicolet's Omnic software package, version 4.1b. The cards were then placed upright in a 60° C. oven, taking care not to allow the oil films to be touched by sources of contamination. Other temperatures can be used, but for oils rich in PUFAs, a temperature of 60° C. led to an oxidation rate that allowed the oxidation curve to be measured with sufficient accuracy with one spectrum per day. Typically, the infrared spectrum of the oil film was taken daily; 32 scans over the spectral range 400-4000 $cm^{-1}$ were performed. This spectral range is wider than the area of interest and used because it provides a wider baseline. Following the acquisition of the spectrum, a baseline correction was performed using the "Automatic Baseline Correction" feature of the Omnic software. As the oil oxidized, a broad peak at 3400 $cm^{-1}$ grew; it arose from the absorbance of the O—H stretch in the peroxide groups. A decay in the absorbance of the C—H stretch associated with cis carbon-carbon double bonds at 3011 $cm^{-1}$ was also observed and is useful for confirmation, but quantitation of the degree of oxidation was achieved by integration of the peroxide peak.

For quantification of the peroxide peak, the thickness of the film is proportional to absorbance of the $CH_2$ stretching peaks at 2900 $cm^{-1}$. By placing the cards horizontally on tissue overnight, generally gives oil films wherein the highest energy of the two $CH_2$ stretching peaks has an absorbance of between 0.2 and 0.6. In order to compare spectra on a consistent basis, the spectrum is normalized, after baseline correction and before integration so that this peak has an absorbance of 1.0. Once the highest energy $CH_2$ stretching peak was normalized, the peroxide peak was then integrated. To compensate for baseline curvature, the whole peak was not integrated. The optimal integration parameters, which was used for all data presented here, as well as for the calibration below, were the baseline was integrated from 3222-3583 $cm^{-1}$ and the integration limits were 3251-3573 $cm^{-1}$.

The above method was calibrated as follows. A series of peroxide value standards were prepared by mixing an oxidized Wesson soy oil with Wesson soy oil from a fresh bottle. The oxidized oil was prepared by adding 126 g of Wesson soy oil, to a 250 mL roundbottom flask and adding 44 mg of iron (II) stearate. The oil was air-sparged in a 90° C. oil bath overnight (16 hours). The oil turned yellow-brown. The final weight of the oil was 128 g. Some iron stearate did not dissolve but stuck to the flask and was removed when the oil was transferred. Titration measurements indicated that the oxidized oil had a PV of 680 meq/kg and that the fresh Wesson soy oil was less than 0.1 meq/kg. Mixture of the two oils were used to prepare calibration standards that were analyzed as described above.

This method is used only to determine the change in the peroxide value from the first sample. In this context, it was found that, $$\Delta PV(meq/kg) = \Delta area * 228.4$$

where $\Delta PV$ is the change in peroxide value and $\Delta area$ is the change in the peak area, reported by Omnic software.

The above described protocol was used to determine the relative stability toward oxidation of oils of the invention having added stabilizers selected from ascorbyl palmitate (AP), propyl gallate (PG), t-butyl hydroquinone (TBHQ) and combinations thereof. In these experiments, other stabilizers were found to not be as effective at delaying the oxidation of the test oils as the stabilizers listed above or the other stabilizers were not approved for use in foods. These less effective or non-food compatible stabilizers were Carotino® from Carotino, SDN, BDH (a mixture of tocotrienols and carotenes), phenanthroline, pentaethylene hexamine (PEH), diethanolamine (DEA), butylated hydroxytoluene (BHT), and combinations thereof.

The studies showed that using the above described thin film IR method, the order of effectiveness of stabilizers or stabilizer combinations is (AP+PG)>AP>PG>TBHQ~untreated oil. This order is somewhat different from the accelerated aging data from Examples 1 and 2 because TBHQ is found to be a very effective stabilizer in conventional aging studies. But, due to the exposure conditions of the thin film of oil, it was determined that the oxidation of the thin films probably undergoes a different mechanism than the oxidation of the bulk oil. For example, the thin film oil oxidation at 60° C. is more similar to high temperature oxidation of oils and thus should provide relative results similar to those for OSI data. To test this hypothesis, OSI studies of the oils with added stabilizers were carried out. The OSI protocol is detailed above and one method for determining OSI values is AOCS Cd 12b-92.

The OSI values for 20% SDA soy oil containing added stabilizers as indicated are tabulated below, wherein two evaluations were made for most samples.

| Stabilizer package | OSI value (hrs at 110° C.) |
| --- | --- |
| None (control) | 0.50, 0.50 |
| 120 ppm TBHQ | 1.80, 1.85 |
| 120 ppm propyl gallate (PG) | 2.75, 2.85 |
| 200 ppm ascorbyl palmitate (AP) | 3.45 |
| 200 ppm AP + 120 PG | 4.75 |
| 500 ppm ascorbyl palmitate (AP) | 5.80, 6.15 |
| 500 ppm AP + 120 PG | 7.50, 7.85 |

Figure 5:
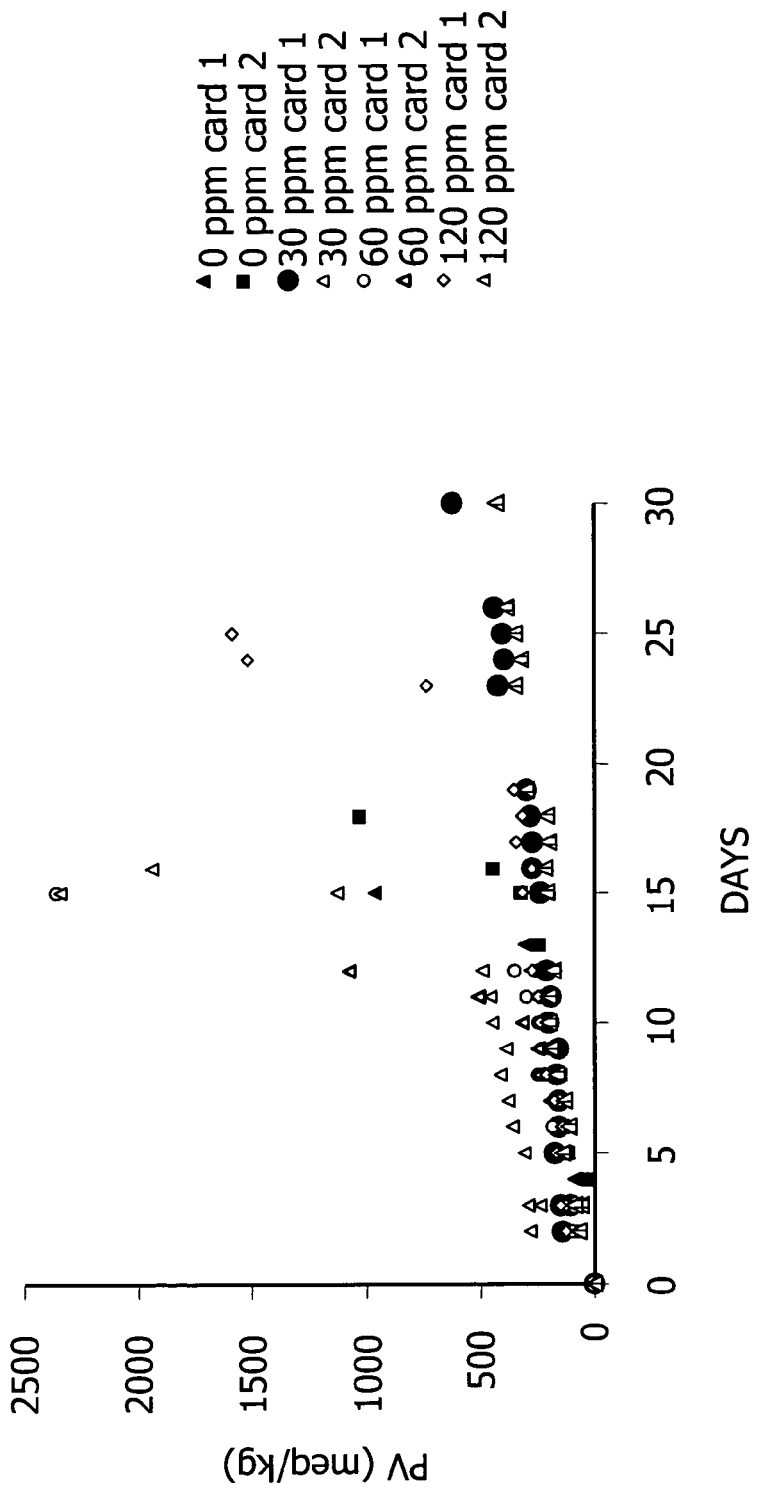
FIG. 5 is a graph of peroxide value (PV) vs. time for a 20% SDA oil composition containing 200 ppm ascorbyl palmitate and 0, 30, 60, and 120 ppm propyl gallate. The graph of FIG. 5 shows the results of an accelerated aging test carried out using a thin film IR method at 60° C.
Figure 6B:
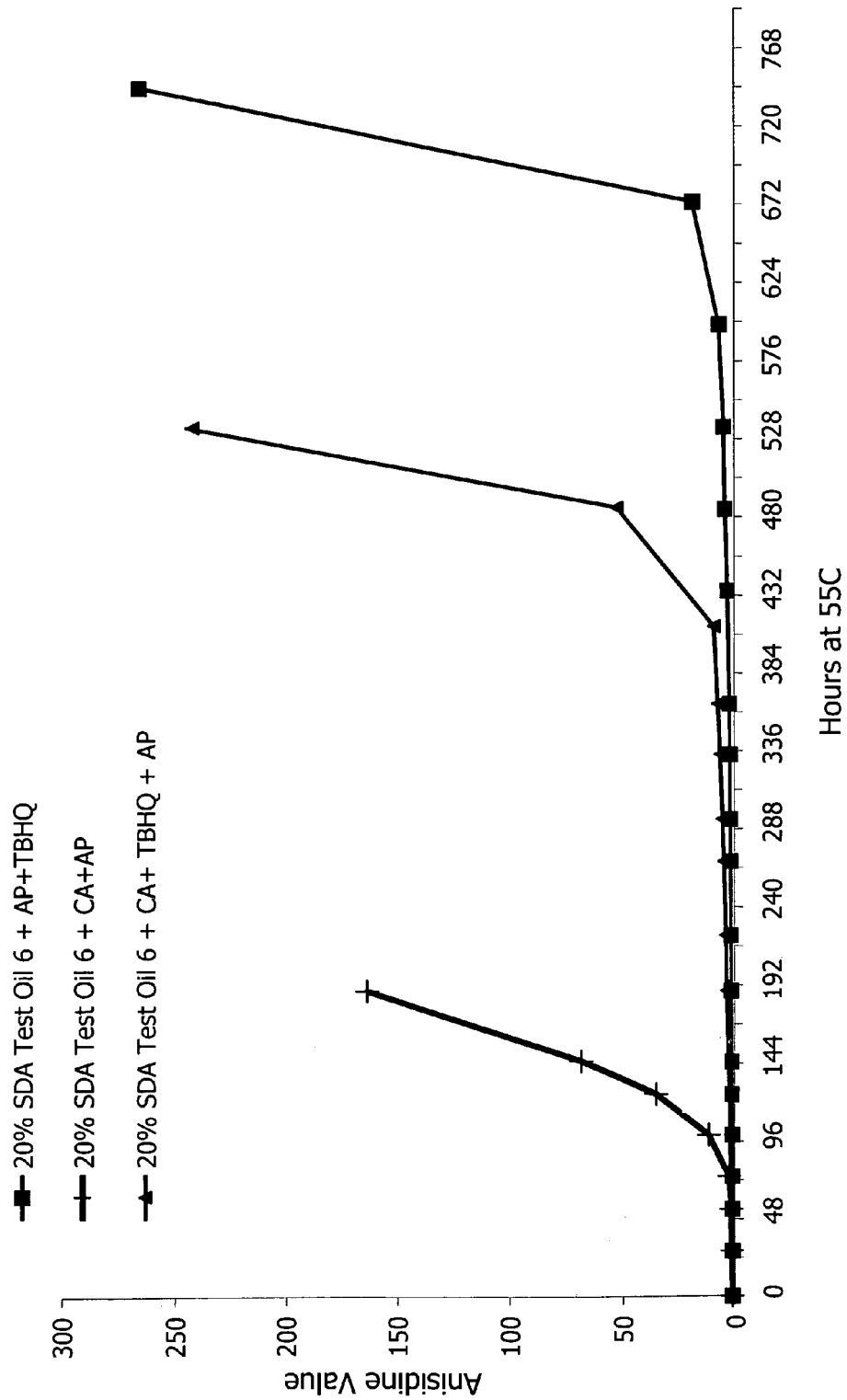
FIG. 6B is a graph of anisidine value (AV) vs. time for a 20% SDA oil composition containing (i) ascorbyl palmitate (AP) and TBHQ, (ii) citric acid (CA) and ascorbyl palmitate (AP), and (iii) citric acid (CA), TBHQ, and ascorbyl palmitate (AP).

As was observed from the OSI data, the order of effectiveness is the same for the OSI data as for the thin film IR data. Exemplary thin film IR data for a 20% SDA oil composition with added PG and AP is shown in FIG. 5.

Example 4

AV-Lowering Resins

A sample of SDA canola oil with an AV=5.41 was used to test the idea that specific resin could lower AV values in oil. Ten grams of oil was added to a microscale "Wheaton-type" RBF and connecting apparatus enabling vacuum capabilities. For each experiment, one gram of resin was added to the oil. Resin #1 was 2-(4-Toluenesulfonyl hydrazine)-ethyl-functionalized silica gel, 200-400 mesh (Aldrich 552593-25g. Resin #2 was 3-aminopropyl-functionalized silica gel (Aldrich 36, 425-8). The mixture was then degassed in the system under vacuum. The oil was then lowered into a 110° C. oil bath and mixed with a stir bar for 1 hr. The mixture was cooled, filtered with a 0.2 um acrodisc and sent for analysis. Experiment 1 was repeated so two AV values are provided.

| EXP # | RESIN # | AV |
| --- | --- | --- |
| RBD control | None | 5.41 |
| 1 | 1 | 0.69, 0.75 |
| 2 | 2 | 0.65 |

The purpose of the aroma study (Sensory Study 1) was to characterize the aroma of SDA-enriched soy oils. As a frame of reference, aroma profiles of processing control soy oils (null-seed oils), as well as several commercially available soy oils and omega-3 containing fish and algal oils were also tested.

The purpose of the aroma/taste/mouth feel study (Sensory Study 2) was to characterize the aroma, taste, and mouth feel of SDA-enriched soy oils. As a frame of reference, aroma, taste, and mouth feel profiles of processing control soy oils (null-seed oils), as well as several commercially available soy oils and omega-3 containing fish and algal oils were also tested.

The following test oils, control oils and comparator oils were evaluated using the Spectrum® standard sensory evaluation. Test oil 1 was a 15% SDA-enriched RBD soy oil (LGNBP739406615BJ9); Test oil 2 was a 15% SDA-enriched RBD soy oil (LLNBP739406915CK1); Test oil 3 was a 20% SDA-enriched RBD soy oil (LMNBP739406920AQ6); Test oil 4 was a 20% SDA-enriched RBD soy oil (LHNBP739406920BJ7); Test oil 5 was a 20% SDA-enriched RBD soy oil (LEGLP050115725SN5); Test oil 6 was a 20% SDA-enriched RBD soy oil (LTAGT050115759SN3); Test oil 7 was an isoline control RBD soy oil (LMAGT050115757SU0); Test oil 8 was a 15% SDA-enriched RBD soy oil (LC739406615BX1); Test oil 9 was a 21% SDA-enriched RBD soy oil (LZAGT050115759SJ9); Test oil 10 was a 17% SDA-enriched RBD soy oil with citric acid (LHAGT050716475SO3); Test oil 11 was a 17% SDA-enriched RBD soy oil with citric acid (LLAGT050716477SY1); and Test oil 12 was a 17% SDA-enriched RBD soy oil with citric acid (LEAGT050716481SU5). Control oil 1 was a RBD soy oil from pooled nulls (LGAGT050115757SU9); Control oil 2 was a RBD soy oil from pooled nulls with citric acid (LNAGT050716474SW4); and Control oil 3 was a RBD soy oil from pooled nulls with citric acid (LMAGT050816495SL7).

For Sensory Study 1, the compositions of the oils used for comparison are described in the table below. Soy oil 1 was a commercially produced soy oil; Soy oil 2 was another commercially produced soy oil; Soy oil 3 was another commercially produced soy oil; Fish oil 1 was a commercially produced fish oil; Flax oil 1 was a commercially produced flax oil; Algal oil 1 was a commercially produced algal oil; and Algal oil 2 was another commercially produced algal oil.

| Relative % | Fish oil 1 | Flax oil 1 | Algal oil 1 | Algal oil 2 | Soy oil 3 | Soy Oil 2 | Soy oil 1 |
| --- | --- | --- | --- | --- | --- | --- | --- |
| C12:0 | 0 | 0 | 0.58 | 6.38 | 0 | 0 | |
| C14:0 | 7.43 | 0 | 12.62 | 17.74 | 0.09 | 0 | 0.08 |
| C16:0 | 17.41 | 0 | 24.21 | 13.69 | 10.48 | 10.68 | 10.41 |
| C16:1 | 9.18 | 5.03 | 0.83 | 2.55 | 0.09 | 0 | 0.09 |

-continued

| Relative % | Fish oil 1 | Flax oil 1 | Algal oil 1 | Algal oil 2 | Soy oil 3 | Soy Oil 2 | Soy oil 1 |
|---|---|---|---|---|---|---|---|
| C18:0 | 3.30 | 3.77 | 0.72 | 0.53 | 4.43 | 3.67 | 4.17 |
| C18:1 n9 | 10.24 | 21.72 | 0.51 | 17.18 | 23.58 | 22.48 | 22.95 |
| C18:1 n7 | 3.10 | 0 | 0 | 0 | 0 | 0 | 1.15 |
| C18:2 | 1.79 | 17.07 | 0.85 | 0.88 | 51.61 | 53.99 | 52.30 |
| C18:3 n6 | 0.43 | 0 | 0 | 0 | 0 | 0 | 0.00 |
| C18:3 n3 | 1.06 | 51.31 | 0.18 | 0 | 5.07 | 8.68 | 7.39 |
| C18:4 n3 | 3.36 | 0 | 0.34 | 0 | 0 | 0 | 0.00 |
| C20:0 | 0.00 | 0.15 | 0.17 | 0.11 | 0.4 | 0.26 | 0.31 |
| C20:1 | 2.56 | 0.22 | 0 | 0 | 0.14 | 0 | 0.17 |
| C20:5 n3 | 17.38 | 0 | 1.3 | 0 | 0 | 0 | |
| C22:0 | 0.00 | 0.13 | 0.17 | 0.13 | 0.29 | 0.25 | 0.33 |
| C22:5 n3 | 2.03 | 0 | 0.26 | 0.31 | 0 | 0 | |
| C22:6 n3 | 10.05 | 0 | 36.0 | 40.15 | 0 | 0 | |
| C24:0 | 0.00 | 0 | 0 | 0 | 0 | 0 | 0.09 |

For Sensory Study 2, the composition of each comparator oil is described in the table below. Comparator oil 1 was a commercially produced RBD soy oil; Comparator oil 2 was a commercially produced RBD soy oil; Comparator oil 3 was a commercially produced fish oil; Comparator oil 5 was a commercially produced menhaden fish oil; Comparator oil 6 was a commercially produced fish oil; Comparator oil 7 was a commercially produced algal oil; and Comparator oil 8 was a commercially produced algal oil.

entered on the Sensory Ballot by the Study Director. Aromatic attributes included but were not limited to: fishy/pondy complex, fishy, pondy, protein/feed, painty, beany, fermented, floral, nutty, cardboard, green, grassy, weedy, vegetable oil, corn cob, and phenol/plastic. Taste attributes included but were not limited to: fishy/pondy complex, fishy, pondy, protein/feed, painty, beany, fermented, floral, nutty, cardboard, green, grassy, weedy, vegetable oil, corn, albumin, seed/nut/pumpkin, and phenol/plastic. Basic tastes were rated on the

| Relative % | Comparator oil 1 | Comparator oil 2 | Comparator oil 3 | Comparator oil 5 | Comparator oil 6 | Comparator oil 7 | Comparator oil 8 |
|---|---|---|---|---|---|---|---|
| C12:0 | | | | | | | |
| C14:0 | | | 6.21 | 9.03 | 6.12 | 10.04 | 3.85 |
| C16:0 | 10.62 | 11.17 | 13.09 | 20.47 | 12.24 | 23.27 | 35.83 |
| C16:1 | | | 5.50 | 12.38 | 5.01 | | |
| C18:0 | 4.35 | 4.06 | 3.59 | 3.93 | 3.31 | | 1.20 |
| C18:1 n9 | 21.51 | 20.82 | 6.11 | 8.94 | 5.4 | | |
| C18:1 n7 | 1.20 | 1.18 | 1.98 | 3.63 | 2.02 | | |
| C18:2 | 53.91 | 55.79 | | 1.64 | 0.83 | | |
| C18:3 n6 | | | | | 4.13 | | |
| C18:3 n3 | 8.41 | 6.98 | | 1.76 | | | |
| C18:4 n3 | | | 4.52 | 3.05 | | | |
| C20:0 | | | | | | | |
| C20:1 | | | | 1.57 | 1.53 | | |
| C20:5 n3 | | | 27.45 | 12.54 | 25.61 | 1.66 | |
| C22:0 | | | | | | | |
| C22:5 n3 | | | | 2.57 | 3.95 | | |
| C22:6 n3 | | | 24.38 | 12.55 | 16.66 | 43.15 | 46.47 |

All test and control oils were packaged in 200 mL to 1000 mL amber glass bottles with screw caps. Test oils and control oils were nitrogen blanketed and frozen immediately after processing. Test and control oils were not opened during storage. Comparator oils were obtained from commercial manufacturers and stored per manufacturer's directions at either 5° C. or −20° C. in original packaging.

The Spectrum™ Descriptive Analysis Method was used to evaluate the oils (Ref: Sensory Evaluation Techniques, $3^{rd}$ ed.; Meilgaard, Morten; Civille, Gail Vance; Carr, B. Thomas; CRC Press LLC, New York, 1999; ISBN 0-8493-0276-5). Test panels consisted of 6-8 members trained in oil evaluation. All panelists convened simultaneously for each of the test session. After warming to room temperature, ½ to 1 ounce aliquots were presented for evaluation.

Each product was evaluated simultaneously by all panelists. Using consensus scoring on a scale of 0 (undetectable) to 15 (extreme), the panelists rated and discussed the total impact as well as each of the sensory attributes detected. One rating for total impact and for each of the descriptors was 0-15 scale for the attributes: sweet, sour, salt, and bitter. Chemical feeling factors were rated on a 0-15 scale for the attributes: astringent, burn, chemical feel. Mouth feel was rated on a 0-15 scale for the attribute: viscosity. Aftertaste was not rated but observed and described.

Test oils 10 through 12, and Control oils 2 and 3, were fresh oils; they were processed to the RBD stage within two months before the start of the study. These oils were tested at the first test session of the study. As part of a cold storage stability test, test oils 8 and 9 were evaluated. Test oil 8 was processed about 1 year before the study and stored at −80° C. until the start of the study. This oil was tested at the first test session of the study. Test oil 9, and Control oil 1 were processed about 6 months prior to the start of the study and stored at −20° C. This oil was tested at the first test session of the study. There were no further samples tested as part of the cold storage stability test.

Accelerated stability test samples were held in a temperature controlled incubation oven at 55° C. (Sensory Study 1). Storage stability test samples were held in a temperature controlled incubation oven at 15° C. (Sensory Study 2).

The following table presents data from data from aroma only test (Sensory Study 1).

TABLE

| Aroma Sensory Evaluation | | | | | | | |
|---|---|---|---|---|---|---|---|
| | Total Impact | Fishy | Pondy | Painty | Beany | Green | Grassy | Vegetative/Leafy |
| Fish Oil 1 | 6.0 | 5.0 | 0.0 | 1.5 | 0.0 | 0.0 | 0.0 | 0.0 |
| Flax Oil 1 | 4.0 | 0.0 | 0.0 | 0.0 | 2.0 | 0.0 | 0.0 | 2.5 |
| Algal Oil 2 | 3.8 | 0.0 | 3.8 | 0.0 | 0.0 | 0.0 | 0.0 | 0.0 |
| Algal Oil 1 | 3.0 | 0.0 | 3.0 | 0.0 | 0.0 | 0.0 | 0.0 | 0.0 |
| Test Oil 4: | 3.3 | 0.0 | 0.0 | 2.0 | 1.2 | 0.0 | 0.0 | 0.0 |
| Soy Oil 3 | 2.5 | 0.0 | 0.0 | 0.0 | 2.0 | 0.0 | 0.0 | 0.0 |
| Test Oil 2: | 2.5 | 0.0 | 2.5 | 0.0 | 0.0 | 0.0 | 0.0 | 0.0 |
| Test Oil 3: | 2.5 | 0.0 | 2.5 | 0.0 | 0.0 | 0.0 | 0.0 | 0.0 |
| Test Oil 5: | 2.2 | 0.0 | 2.2 | 0.0 | 0.0 | 0.0 | 0.0 | 0.0 |
| Test Oil 1: | 1.5 | 0.0 | 1.0 | 0.0 | 1.0 | 0.0 | 0.0 | 0.0 |
| Test Oil 6: | 2.0 | 0.0 | 1.5 | 0.0 | 0.0 | 0.5 | 0.5 | 0.0 |
| Test Oil 7: | 1.0 | 0.0 | 0.0 | 0.3 | 1.0 | 0.0 | 0.0 | 0.0 |
| Soy Oil 1 | 1.0 | 0.0 | 0.0 | 0.0 | 1.0 | 0.0 | 0.0 | 1.0 |

The following table presents data from aroma/taste/mouth feel tests (Sensory Study 2).

TABLE

| Aroma, Flavor, and Taste Sensory Evaluation | | | | | | | | |
|---|---|---|---|---|---|---|---|---|
| | Test Oil 8 at 0 months | Test Oil 9 at 0 months & at 1 mo., 3 mos., 4 mos. at 25° C. | Test Oil 10 at 0 months | Test Oil 11 at 0 months | Test Oil 12 at 0 months | Control Oil 1 at 0 months & at 1 mo., 2 mos., 3 mos. at 25° C. | Control Oil 2 at 0 months | Control Oil 3 at 0 months |
| Aroma | | | | | | | | |
| Total Impact | 1.2 | 1.8, 1.5, 5.5, 2.0(3.2) | 1.0 | 1.7 | 3.5 | 1.2, 1.2, 1.2, 1.2 | 1.0 | 0.8 |
| Fishy/Pondy Complex | 0.0 | 1.3, 0.0, 2.5, 1.0(1.0) | 0.5 | 1.2 | 2.5 | 0.0, 0.0, 0.0, 0.0 | 0.0 | 0.0 |
| Fishy | 0.0 | 0.0, 0.0, 2.0, 0.0 | 0.0 | 0.0 | 0.0 | 0.0, 0.0, 0.0, 0.0 | 0.0 | 0.0 |
| Pondy | 0.0 | 1.3 algae, 0.0, 0.0, 1.0(0.5) | 0.5 | 1.2 | 2.5 | 0.0, 0.0, 0.0, 0.0 | 0.0 | 0.0 |
| Protein/Feed | 0.0 | 0.0, 0.0, 0.0, 0.0 | 0.0 | 0.0 | 0.0 | 0.0, 0.0, 0.0, 0.0 | 0.0 | 0.0 |
| Painty | 0.0 | 0.0, 0.0, 4.0, 0.0(3.0) | 0.0 | 0.0 | 0.0 | 0.0, 0.0, 0.0, 0.0 | 0.0 | 0.0 |
| Beany | 1.0 | 0.5, 1.5, 0.0, 0.0 | 0.0 | 0.0 | 0.0 | 0.5, 1.2, 1.2, 1.2 | 0.0 | 0.0 |
| Fermented | 0.0 | 0.0, 0.0, 0.0, 0.0 | 0.0 | 0.0 | 0.0 | 0.0, 0.0, 0.0, 0.0 | 0.0 | 0.0 |
| Floral | 0.0 | 0.0, 0.0, 0.0, 0.0 | 0.0 | 0.0 | 0.0 | 0.0, 0.0, 0.0, 0.0 | 0.0 | 0.0 |
| Nutty | 0.0 | 0.0, 0.0, 0.0, 0.0 | 0.0 | 0.0 | 0.0 | 0.0, 0.0, 0.0, 0.0 | 0.0 | 0.0 |
| Cardboard | 0.0 | 0.0, 0.0, 0.0, 0.0 | 0.0 | 0.0 | 1.2 | 0.0, 0.0, 0.0, 0.0 | 0.0 | 0.0 |
| Green | 0.0 | 0.0, 0.0, 0.0, 1.0 | 0.5 | 0.7 | 0.0 | 0.0, 0.0, 0.0, 0.0 | 0.0 | 0.8 |
| Grassy | 0.0 | 0.0, 0.0, 0.0, 0.0 | 0.0 | 0.0 | 0.0 | 0.0, 0.0, 0.0, 0.0 | 0.0 | 0.0 |
| Weedy | 0.0 | 0.0, 0.0, 0.0, 0.0 | 0.0 | 0.0 | 0.0 | 0.0, 0.0, 0.0, 0.0 | 0.0 | 0.0 |
| Vegetable Oil | 0.0 | 0.0, 0.0, 0.0, 0.0 | 0.0 | 0.0 | 0.0 | 1.0, 0.0, 0.0, 0.0 | 1.0 | 0.0 |
| Corn Cob | 0.0 | 0.0, 0.0, 0.0, 0.0 | 0.0 | 0.0 | 0.0 | 0.0, 0.0, 0.0, 0.0 | 0.0 | 0.0 |
| Aromatics/Flavor | | | | | | | | |
| Total Impact | 1.3 | 2.0, 2.5, 6.5, 3.0(4.0) | 1.0 | 2.5 | 3.5 | 1.0, 1.5, 1.5, 1.8 | 3.0 | 0.8 |
| Fishy/Pondy Complex | 0.0 | 2.0, 1.0, 4.0, 1.8(3.0) | 0.0 | 2.0 | 2.8 | 0.0, 0.0, 0.0, 0.0 | 0.0 | 0.0 |
| Fishy | 0.0 | 0.0, 0.0, 2.0, 0.0(3.0) | 0.0 | 0.0 | 0.8 | 0.0, 0.0, 0.0, 0.0 | 0.0 | 0.0 |
| Pondy | 0.0 | 2.0, 1.0, 2.0, 1.8 | 0.0 | 1.5 | 2.0 | 0.0, 0.0, 0.0, 0.0 | 0.0 | 0.0 |
| Protein/Feed | 0.0 | 0.0, 0.0, 0.0, 0.0 | 0.0 | 0.0 | 0.0 | 0.0, 0.0, 0.0, 0.0 | 0.0 | 0.0 |
| Painty | 0.0 | 0.0, 0.0, 4.0, 0.0(0.5) | 0.0 | 0.0 | 0.0 | 0.0, 0.0, 0.0, 0.0 | 0.0 | 0.0 |
| Beany | 1.3 | 0.5, 1.5, 0.0, 1.0 | 0.5 | 0.0 | 0.0 | 0.0, 1.5, 1.5, 1.5 | 0.0 | 0.0 |
| Fermented | 0.0 | 0.0, 0.0, 0.0, 0.0 | 0.0 | 0.0 | 0.0 | 0.0, 0.0, 0.0, 0.0 | 0.0 | 0.0 |
| Floral | 0.0 | 0.0, 0.0, 0.0, 0.0 | 0.0 | 0.0 | 0.0 | 0.0, 0.0, 0.0, 0.0 | 0.0 | 0.0 |
| Nutty | 0.0 | 0.0, 0.0, 0.0, 0.0 | 0.0 | 0.0 | 0.0 | 0.0, 0.0, 0.0, 0.0 | 0.0 | 0.0 |
| Cardboard | 0.0 | 0.0, 0.0, 0.0, 0.0 | 0.0 | 0.0 | 1.0 | 0.0, 0.0, 0.0, 0.5 | 0.0 | 0.0 |
| Green | 0.0 | 0.0, 0.0, 0.0, 0.0 | 0.5 | 0.5 | 0.0 | 0.0, 0.0, 0.0, 0.0 | 0.0 | 0.0 |
| Grassy | 0.0 | 0.0, 0.0, 0.0, 0.0 | 0.0 | 0.0 | 0.0 | 0.0, 0.0, 0.0, 0.0 | 0.0 | 0.0 |
| Weedy | 0.0 | 0.0, 0.0, 0.0, 0.0 | 0.0 | 0.0 | 0.0 | 0.0, 0.0, 0.0, 0.0 | 0.0 | 0.0 |
| Vegetable Oil | 0.0 | 0.0, 0.0, 0.0, 0.0 | 0.0 | 0.0 | 0.0 | 1.0, 0.0, 0.0, 0.0 | 0.0 | 0.8 |
| Corn | 0.0 | 0.0, 0.0, 0.0, 0.0 | 0.0 | 0.0 | 0.0 | 0.0, 0.0, 0.0, 0.0 | 0.0 | 0.0 |

TABLE-continued

Aroma, Flavor, and Taste Sensory Evaluation

| | | | | | | | | |
|---|---|---|---|---|---|---|---|---|
| Albumin | 0.0 | 0.0, 0.0, 0.0, 0.0 | 0.0 | 0.0 | 0.0 | 1.0, 0.0, 0.0, 0.0 | 0.0 | 0.0 |
| Seed/Nut/Pumpkin | 0.0 | 0.0, nt, nt, nt | 0.0 | 0.0 | 0.0 | 0.0, nt, nt, nt | 3.0 | nt |
| Basic Tastes | | | | | | | | |
| Sweet | 1.0 | 1.5, 1.0, 1.5, 1.5(1.3) | 1.0 | 1.5 | 2.0 | 1.5, 1.5, 1.5, 1.5 | 1.5 | 1.5 |
| Sour | 0.0 | 0.0, 0.0, 0.0, 0.0 | 0.0 | 0.0 | 0.0 | 0.0, 0.0, 0.0, 0.0 | 0.0 | 0.0 |
| Salt | 0.0 | 0.0, 0.0, 0.0, 0.0 | 0.0 | 0.0 | 0.0 | 0.0, 0.0, 0.0, 0.0 | 0.0 | 0.0 |
| Bitter | 0.0 | 0.0, 0.0, 0.0, 0.0 | 0.0 | 0.0 | 0.0 | 0.0, 0.0, 0.0, 0.0 | 0.0 | 0.0 |
| Chemical Feeling Factors | | | | | | | | |
| Astringent | 0.0 | 0.0, 0.0, 0.0, 0.0 | 0.0 | 0.0 | 0.0 | 0.0, 0.0, 0.0, 0.0 | 0.0 | 0.0 |
| Burn | 0.0 | 0.0, 0.0, 0.0, 0.0 | 0.0 | 0.0 | 0.0 | 0.0, 0.0, 0.0, 0.0 | 0.0 | 0.0 |
| Chem Feel (stimulate tongue chem sensation or warming | 0.0 | 0.0, nt, nt, nt | 0.0 | 0.0 | 0.0 | 0.0, nt, nt, nt | 1.5 | nt |
| Mouthfeel | | | | | | | | |
| Viscosity | 5.0 | 6.0, 6.0, 7.0, 6.3(6.0) | 6.5 | 6.0 | 6.5 | 6.0, 5.5, 5.5, 5.7 | 7.0 | 6.5 |
| Aftertaste | beany | Pondy; pondy, beany; fishy, pondy, painty; pondy(fishy, sardine) | green, pondy (1) | pondy, fishy(2) | pondy, fishy (3) | veg oil; beany; beany; beany | seedy | |

| Attributes | Comparator Oil 1 | Comparator Oil 2 | Comparator Oil 3 | Comparator Oil 8 | Comparator Oil 5 | Comparator Oil 7 | Comparator Oil 6 |
|---|---|---|---|---|---|---|---|
| Aroma | | | | | | | |
| Total Impact | 1.5 | 2.0 | 7.0 | 6.0 | 4.5 | 3.0 | 3.5 |
| Fishy/Pondy* | 0.0 | 0.0 | 5.0 fishy | 5.0 fishy/pondy | 2.5 pondy | 3.0 pondy | 3.0 |
| Protein/Feed | 0.0 | 0.0 | 0.0 | 0.0 | 0.0 | 0.0 | 0.0 |
| Painty | 0.0 | 0.0 | 3.0 | 2.5 | 1.0 | 0.0 | 0.0 |
| Beany | 1.5 | 0.0 | 0.0 | 0.0 | 0.0 | 0.0 | 0.0 |
| Fermented | 0.0 | 0.0 | 0.0 | 0.0 | 0.0 | 0.0 | 0.0 |
| Floral | 0.0 | 0.0 | 0.0 | 0.0 | 0.0 | 0.0 | 0.0 |
| Nutty | 0.0 | 0.0 | 0.0 | 0.0 | 0.0 | 0.0 | 0.0 |
| Cardboard | 0.0 | 0.0 | 0.0 | 0.0 | 1.5 | 0.0 | 0.0 |
| Green | 0.0 | 0.0 | 0.0 | 0.0 | 0.0 | 0.0 | 0.0 |
| Grassy | 0.0 | 0.0 | 0.0 | 0.0 | 0.0 | 0.0 | 0.0 |
| Weedy | 0.0 | 0.0 | 0.0 | 0.0 | 0.0 | 0.0 | 0.0 |
| Vegetable Oil | 0.0 | 0.0 | 0.0 | 0.0 | 0.0 | 0.0 | 0.0 |
| Corn Cob | 0.0 | 2.0 | 0.0 | 0.0 | 0.0 | 0.0 | 0.0 |
| Aromatics/Flavor | | | | | | | |
| Total Impact | 1.2 | 2.2 | 7.0 | 7.5 | 5.0 | 4.0 | 3.0 |
| Fishy/Pondy* | 0.0 | 0.0 | 4.0 fishy/pondy | 5.0 fishy/pondy | 5.0 pondy | 3.3 pondy | 3.0 pondy->fishy |
| Protein/Feed | 0.0 | 0.0 | 0.0 | 0.0 | 0.0 | 0.0 | 0.0 |
| Painty | 0.0 | 0.0 | 0.0 | 3.5 | 0.0 | 0.0 | 0.0 |
| Beany | 1.0 | 0.0 | 0.0 | 0.0 | 0.0 | 0.0 | 0.0 |
| Fermented | 0.0 | 0.0 | 4.0 | 0.0 | 0.0 | 0.0 | 0.0 |
| Floral | 0.0 | 0.0 | 0.0 | 0.0 | 0.0 | 0.0 | 0.0 |
| Nutty | 0.0 | 0.0 | 0.0 | 0.0 | 0.0 | 0.0 | 0.0 |
| Cardboard | 0.0 | 0.0 | 0.0 | 0.0 | 0.0 | 0.0 | 0.0 |
| Green | 0.5 | 0.0 | 0.0 | 0.0 | 0.0 | 0.0 | 0.0 |
| Grassy | 0.5 | 0.0 | 0.0 | 0.0 | 0.0 | 0.0 | 0.0 |
| Weedy | 0.0 | 0.0 | 0.0 | 0.0 | 0.0 | 0.0 | 0.0 |
| Vegetable Oil | 0.0 | 0.0 | 0.0 | 0.0 | 0.0 | 0.0 | 0.0 |
| Corn | 0.0 | 2.2 | 0.0 | 0.0 | 0.0 | 0.0 | 0.0 |
| Albumin | 0.0 | 0.0 | 0.0 | 0.0 | 0.0 | 1.5 | 0.0 |
| Basic Tastes | | | | | | | |
| Sweet | 1.5 | 2.8 | 1.0 | 1.5 | 1.5 | 2.0 | 1.5 |
| Sour | 0.0 | 0.0 | 0.0 | 0.0 | 0.0 | 0.0 | 0.0 |
| Salt | 0.0 | 0.0 | 0.0 | 0.0 | 0.0 | 0.0 | 0.0 |
| Bitter | 0.0 | 0.0 | 0.0 | 0.0 | 0.0 | 0.0 | 0.0 |
| Chemical Feeling Factors | | | | | | | |
| Astringent | 0.0 | 0.0 | 0.0 | 0.0 | 0.0 | 0.0 | 0.0 |
| Burn | 0.0 | 1.0 | 0.0 | 1.0 | 0.0 | 0.0 | 0.0 |

TABLE-continued

Aroma, Flavor, and Taste Sensory Evaluation

Mouthfeel

| Viscosity | 6.5 | 5.5 | 7.0 | 6.5 | 6.0 | 6.5 | 7.0 |
|---|---|---|---|---|---|---|---|
| Aftertaste | beany | corn | fishy = anchovies with low painty, codliver oil, Desitin | pondy fishy painty, | pondy metallic aromatic (iron) (1) | pondy algae 1 fishtank throat irritation | pondy with some fishy |

Example 6

Mayonnaise Preparation

Soybean oil (3720 g) and omega-3 vegetable oil (1800 g) were blended together, resulting in an oil composition as follows:

| | |
|---|---|
| Free Fatty acids, % | 0.35 |
| Peroxide Value | 0.09 |
| Color 1.3Y 0.0R | |
| Chlorophyll, ppm | 0.00 |
| Anisidine Value | 0.20 |

Fatty Acid Composition, %

| | |
|---|---|
| C14 (myristic) | 0.04 |
| C16 (Pamitic) | 11.15 |
| C16:1n7 (Palmitoleic) | 0.11 |
| C18:0 (Stearic) | 4.58 |
| C18:1 n9 (Oleic) | 20.24 |
| C18:1 (Ocadecenoic) | 1.36 |
| C18:2n6 (Linoleic) | 45.17 |
| C18:3n6 (gammalinolenic) | 3.00 |
| C18:3n3 (alphalinolenic) | 3.41 |
| C18:4n3 (octadecatetrenoic) | 3.21 |
| C20:3n6 (dihomogammalinolenic acid) | 0.05 |
| C20:4n6 (arachidonic acid) | 0.20 |
| C20:5n3 (eicosapentaenoic acid) | 2.95 |
| C22:6n3 (docosahexanoic acid) | 1.96 |
| C20 (Arachidic) | 0.35 |
| C20:1 n9 (eicosenoic) | 0.15 |
| C22 (Behenic) | 0.32 |
| C24 (Lignoceric) | 0.12 |
| Others | 1.64 |

The following ingredients in addition to the oil blend above were used to prepare a mayonnaise: vinegar (6300 g), egg ingredients (720 g), water (3000 g), and salt (1300 g). The headspace of all blending vessels was blanketed with nitrogen. An emulsified dressing was then prepared by dispersing the egg in 240 g of the water. Salt was then added. Thereafter, the oil was slowly added to the egg water dispersion. This was under rapid agitation. The remaining water and vinegar were added and the loose emulsion was passed through a colloid mill (such as a Fryma mill). The resultant mixture had a pH of 4.0. The resultant product had the characteristics and stability of mayonnaise. The resultant product was used to make a turkey sandwich, coleslaw and potato salad. The finished foods were indistinguishable in tests from a mayonnaise made with an oil that did not contain any fatty acids with more than four double bonds.

The invention claimed is:

1. A deodorized oil composition comprising at least about 0.4 wt. % of at least one polyunsaturated fatty acid having four or more carbon-carbon double bonds or a derivative thereof based upon the total weight of fatty acids or derivatives thereof in the composition, and either:
    (a) the composition having less than 1 wt. % trans-fatty acid based upon the total weight of fatty acids or derivatives thereof in the composition;
    (b) the composition being derived from a source other than a marine oil and having a peroxide value of less than about 1 meq/kg;
    (c) the composition being derived from a source other than a marine oil and having an anisidine value of less than about 3;
    (d) the polyunsaturated fatty acid being stearidonic acid or a derivative thereof, and the composition further comprising at least one additional polyunsaturated fatty acid having four or more carbon-carbon double bonds or a derivative thereof, the composition having an anisidine value of less than about 3;
    (e) the composition being derived from a genetically-modified seed selected from the group consisting of *Arabidopsis*, carrot, coconut, corn, cotton, flax, linseed, maize, palm kernel, peanut, potato, safflower, soybean, sunflower, tobacco, and mixtures thereof;
    (f) the composition has an aroma total impact score of up to about 2.5, wherein total impact is determined by a standardized sensory evaluation; or
    (g) the composition has an aromatics/flavor total impact score of up to about 2.5, wherein total impact is determined by a standardized sensory evaluation.

2. The composition of claim 1 comprising from about 5 wt. % to about 30 wt. % stearidonic acid or a derivative thereof based upon the total weight of fatty acids or derivatives thereof in the composition, the composition having an anisidine value of less than about 3 or a peroxide value less than about 1 meq/kg.

3. The composition of claim 1 wherein the composition has a peroxide value of up to about 10 meq/kg.

4. The composition of claim 1 wherein the composition has an anisidine value of up to about 20.

5. The composition of claim 1 wherein the composition has a totox value of up to about 26.

6. The composition of claim 1 wherein the composition comprises up to about 5,000 ppm tocopherols.

7. The composition of claim 1 wherein the composition comprises not more than 10 wt. % trans-fatty acid.

8. The composition of claim 1 wherein the polyunsaturated fatty acid or derivative thereof comprises stearidonic acid or a derivative thereof.

9. A food, beverage, nutritional supplement, or cooking oil comprising the oil of claim 1.

10. The composition of claim 1 further comprising a stabilizer selected from the group consisting of citric acid, t-butyl hydroquinone, ascorbyl palmitate, propyl gallate, and combinations thereof.

11. The composition of claim 1 comprising a deodorized oil having less than 1 wt. % trans-fatty acid based upon the total weight of fatty acids or derivatives thereof in the composition.

12. The composition of claim 1 being derived from a source other than a marine oil and having a peroxide value of less than about 1 meq/kg.

13. The composition of claim 1 being derived from a source other than a marine oil and having an anisidine value of less than about 3.

14. The composition of claim 1 wherein the polyunsaturated fatty acid comprises stearidonic acid or a derivative thereof, and the composition further comprises at least one additional polyunsaturated fatty acid having four or more carbon-carbon double bonds or a derivative thereof, the composition having an anisidine value of less than about 3.

15. The composition of claim 1 being derived from a genetically-modified seed selected from the group consisting of *Arabidopsis*, carrot, coconut, corn, cotton, flax, linseed, maize, palm kernel, peanut, potato, safflower, soybean, sunflower, tobacco, and mixtures thereof.

16. The composition of claim 1 having an aroma total impact score of up to about 2.5, wherein total impact is determined by a standardized sensory evaluation.

17. The composition of claim 1 having an aromatics/flavor total impact score of up to about 2.5, wherein total impact is determined by a standardized sensory evaluation.

* * * * *

UNITED STATES PATENT AND TRADEMARK OFFICE
CERTIFICATE OF CORRECTION

| | | |
|---|---|---|
| PATENT NO. | : 7,902,388 B2 | Page 1 of 1 |
| APPLICATION NO. | : 11/266983 | |
| DATED | : March 8, 2011 | |
| INVENTOR(S) | : Heise et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1188 days.

Signed and Sealed this
Seventh Day of June, 2011

David J. Kappos
*Director of the United States Patent and Trademark Office*